(12) United States Patent
Yang

(10) Patent No.: US 12,075,967 B2
(45) Date of Patent: Sep. 3, 2024

(54) MOBILE ROBOT AND CONTROL METHOD OF MOBILE ROBOTS

(71) Applicant: LG ELECTRONICS INC., Seoul (KR)

(72) Inventor: Myungho Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 305 days.

(21) Appl. No.: 17/595,010

(22) PCT Filed: May 7, 2020

(86) PCT No.: PCT/KR2020/005987
§ 371 (c)(1),
(2) Date: Nov. 5, 2021

(87) PCT Pub. No.: WO2020/226426
PCT Pub. Date: Nov. 12, 2020

(65) Prior Publication Data
US 2022/0211236 A1   Jul. 7, 2022

(30) Foreign Application Priority Data

May 7, 2019   (KR) ........................ 10-2019-0053073

(51) Int. Cl.
*A47L 9/28* (2006.01)
*A47L 9/00* (2006.01)
*G05D 1/00* (2024.01)

(52) U.S. Cl.
CPC ............. *A47L 9/2826* (2013.01); *A47L 9/009* (2013.01); *A47L 9/281* (2013.01); *A47L 9/2852* (2013.01); *A47L 9/2894* (2013.01); *G05D 1/0214* (2013.01); *G05D 1/0274* (2013.01); *G05D 1/0297* (2013.01); *A47L 2201/04* (2013.01); *A47L 2201/06* (2013.01)

(58) Field of Classification Search
CPC ........ A47L 9/2826; A47L 9/009; A47L 9/281; A47L 9/2852; A47L 9/2894; A47L 2201/04; A47L 2201/06; A47L 9/2889; A47L 9/0466; A47L 11/4011; G05D 1/0214; G05D 1/0274; G05D 1/0297; B25J 11/00; B25J 9/1664; B25J 9/1674; B25J 9/1697; B25J 11/0085; B25J 19/02
See application file for complete search history.

(56) References Cited

U.S. PATENT DOCUMENTS

2005/0166355 A1    8/2005  Tani
2018/0344114 A1*  12/2018  Scholten ............... G05D 1/0261
2021/0282613 A1*   9/2021  Fong .................... G05D 1/0044

FOREIGN PATENT DOCUMENTS

| CN | 201757840 U | 3/2011 |
| CN | 104771115 A | 7/2015 |
| CN | 108725127 A | 5/2017 |

(Continued)

*Primary Examiner* — David Redding
(74) *Attorney, Agent, or Firm* — Birch, Stewart, Kolasch & Birch, LLP

(57) ABSTRACT

The present disclosure discloses a mobile robot in which at least one suspected wet contaminated region where a dust concentration is relatively low is specified in a cleaning area, and the suspected wet contaminated region is specified as a wet contaminated region based on a floor image of the suspected wet contaminated region.

13 Claims, 18 Drawing Sheets

(56) References Cited

FOREIGN PATENT DOCUMENTS

| | | | |
|---|---|---|---|
| CN | 107422390 A | | 12/2017 |
| CN | 108008724 A | | 5/2018 |
| CN | 109664301 A | | 4/2019 |
| EP | 3 138 458 A1 | | 3/2017 |
| JP | 2007-29328 A | | 2/2007 |
| KR | 10-2005-0087644 A | | 8/2005 |
| KR | 10-2012-0058945 A | | 6/2012 |
| KR | 10-2013-0120554 A | | 11/2013 |
| KR | 10-2014-0133369 A | | 11/2014 |
| KR | 10-1613467 B1 | | 4/2016 |
| KR | 10-2016-0089835 A | | 7/2016 |
| KR | 10-2017-0048815 A | | 5/2017 |
| KR | 10-2019-0134971 A | | 12/2018 |
| KR | 10-2020-0029969 A | | 3/2020 |
| WO | WO 2019/058124 A1 | | 3/2019 |
| WO | WO2021172932 | * | 5/2020 |
| WO | WO2020096232 | * | 9/2021 |

* cited by examiner

MOBILE ROBOT AND CONTROL METHOD OF MOBILE ROBOTS

TECHNICAL FIELD

The present disclosure relates to a mobile robot, and more particularly, to a mobile robot capable of cleaning by map sharing and collaborating with other mobile robots.

BACKGROUND ART

Robots have been developed for industrial use and have been responsible for a part of factory automation. In recent years, a field of application of robots has been further expanded, and thus, medical robots, aerospace robots, etc. have been developed and home robots that can be used in homes are also being made. Among these robots, a robot capable of driving by itself is called a mobile robot. A representative example of a mobile robot used at home is a robot cleaner.

Various techniques for sensing an environment and a user around a robot cleaner through various sensors provided in a robot cleaner are known. In addition, techniques are known in which a robot cleaner learns a cleaning area and create a map by itself and grasps a current location on a map. A robot cleaner that cleans while driving in a preset manner is known.

In order to detect a distance to an obstacle or a wall and create a map in a surrounding environment, a conventional robot cleaner uses an optical sensor since a distance, a terrain, and an obstacle image may be easily determined or grasped by the optical sensor.

In addition, in the prior art of Korea Patent Laid-open Publication No. 10-2014-0138555, a map is created through using a plurality of sensors, and a plurality of robots share maps. In this case, each robot recognizes a location based on an initial starting point. However, since each robot has its own starting point, each robot does not know location and environment information of other robots.

In particular, in a case that different types of robots are used, different maps are created for the same cleaning area due to differences in a method of creating a map, a type and sensitivity of a plurality of sensors, and thus, sizes, coordinate directions, or so on between the maps do not match. In addition, when the maps are different as in the above, collaborative cleaning, location information sharing, and environment information sharing become difficult, and thus, collaborative cleaning may be impossible.

In addition, in order to efficiently perform collaborative cleaning using a plurality of mobile robots as described above, a plurality of mobile robots may need to grasp a location of other mobile robot. To grasp relative position of the plurality of mobile robots, an additional position sensor, such as, using a ultrasonic wave, radar, or so on may be used. However, even in this case, it is difficult to grasp the relative positions when a separation distance of the plurality of mobile robots increases. In order to overcome the disadvantage, if a mobile robot equipped with a high-performance sensor that can accurately recognize a location of other mobile robot even when the mobile robots are far apart from each other, cost of an entire product may increase.

In addition, if cleaning manners of a plurality of mobile robots are different from each other, an area that can be cleaned and an area that cannot be cleaned may exist in a cleaning area. Specifically, when a dry cleaner finds a liquid or a sticky contaminant, if a dry cleaner performs cleaning, a filter of the dry cleaner may be damaged or the cleaning may not be performed in the case that the liquid has a high viscosity.

In addition, a cleaner may not accurately determine a liquid or a sticky contaminant.

SUMMARY

Technical Problem

The present disclosure is for providing a plurality of robot cleaners and a control method thereof being configured to efficiently clean by a collaborative cleaning of the plurality of mobile robots in the same space when the plurality of mobile robots use different cleaning manners.

Also, the present disclosure is for providing a mobile robot and a control method thereof being able to accurately detect a liquid or a sticky contaminant and accurately specify a location of the liquid or the sticky contaminant.

In addition, the present disclosure is for providing a control method of a plurality of mobile robot being able to accurately transmit a location of a wet contaminated region from one of the plurality of mobile robots to another one of the plurality of mobile robots when the plurality of mobile robots use different cleaning manners.

Further, the present disclosure is for providing a mobile robot being able to efficiently and accurately match different cleaning maps when a plurality of mobile robots use the different cleaning maps for the same space.

Technical Solution

The present disclosure includes specifying of a wet contaminated region based on a dust concentration sucked into a robot cleaner or a mobile robot and a floor image of a periphery of a main body.

In addition, the present disclosure includes specifying of a wet contaminated region based on a dust concentration sucked into a robot cleaner or a mobile robot and a floor image of a periphery of a main body and cleaning the wet contaminated region using a robot cleaner having a different manner.

Specifically, a mobile robot according to an embodiment includes a driving unit of moving a main body, a cleaning unit of sucking a dust, a dust sensor of measuring a dust concentration in air sucked by the cleaning unit, a floor image sensor of obtaining a floor image of a periphery of the main body, and a controller of determining a wet contaminated region based on information input from the dust sensor and the floor image sensor. The controller specifies at least one suspected wet contaminated region where the dust concentration is relatively low in a cleaning area, and specifies the suspected wet contaminated region as the wet contaminated region based on a floor image of the suspected wet contaminated region.

The controller may compare the floor image of the suspected wet contaminated region with a floor image of a periphery of the suspected wet contaminated region to specify the wet contaminated region.

The controller may compare a color of the floor image of the suspected wet contaminated region with a color of a floor image of a periphery of the suspected wet contaminated region to specify the wet contaminated region.

The controller may divide the floor image of the suspected wet contaminated region into a plurality of lower suspect regions and compare colors of floor images of the plurality of lower suspect regions to specify at least one of the plurality of lower suspect regions as the wet contaminated region.

The controller may divide the floor image of the suspected wet contaminated region into a plurality of lower suspect regions and compare floor heights of floor images of the plurality of lower suspect regions to specify at least one of the plurality of lower suspect regions as the wet contaminated region.

The controller may transmit location information of the wet contaminated region to a second mobile robot that cleans in a different manner from the mobile robot.

The controller may transmit a floor image of the wet contaminated region to a terminal connected by wireless communication with the mobile robot.

In addition, the mobile robot may include a sweeping portion of rotating around a rotation axis to sweep a floor, and a sweeping load sensor of measuring a load of the sweeping portion.

The controller may specify the suspected wet contaminated region as the wet contaminated region based on the floor image of the suspected wet contaminated region and the load of the sweeping portion of the suspected wet contaminated region.

The location information of the wet contaminated region may include an image of a periphery of the wet contaminated region.

The location information of the wet contaminated region may include a coordinate of the wet contaminated region on an obstacle map and a received signal strength indication (RSSI) value between the second mobile robot and the mobile robot.

The controller may transmit a control command to the second mobile robot so that the second mobile robot cleans the wet contaminated region.

The controller may control the mobile robot to wait at a periphery of the wet contaminated region when the second mobile robot cleans the wet contaminated region.

Further, in a control method of a plurality of mobile robots according an embodiment, the plurality of mobile robots includes a first mobile robot and a second mobile robot having a different cleaning manner from the first mobile robot. The control method of the plurality of mobile robots includes specifying a wet contaminated region in a cleaning area by the first mobile robot, transmitting an obstacle map including location information of the wet contaminated region and a cleaning command for cleaning the wet contaminated region to the second mobile robot when the first mobile robot specifies the wet contaminated region, moving the second mobile robot to the wet contaminated region when the second mobile robot receives the cleaning command for cleaning the wet contaminated region, and cleaning the wet contaminated region by the second mobile robot.

In the step of specifying of the wet contaminated area, at least one suspected wet contaminated region where a dust concentration is relatively low may be specified in the cleaning area, and the suspected wet contaminated region may be specified as the wet contaminated region based on a floor image of the suspected wet contaminated region.

In the step of specifying of the wet contaminated area, the floor image of the suspected wet contaminated region may be divided into a plurality of lower suspect regions and colors of floor images of the plurality of lower suspect regions may be compared to specify at least one of the plurality of lower suspect regions as the wet contaminated region.

The control method of the plurality of mobile robots according the embodiment may further include detecting a load of a sweeping portion. In the step of specifying of the wet contaminated area, the suspected wet contaminated region may be specified as the wet contaminated region based on a floor image of the suspected wet contaminated region and the load of the sweeping portion at the suspected wet contaminated region.

The first mobile robot may wait at a periphery of the wet contaminated region until the second mobile robot completes the moving to the wet contaminated region.

The control method of the plurality of mobile robots according the embodiment may further include determining by the first mobile robot whether a wet contaminant is removed from the wet contaminated region after the second mobile robot completes the cleaning of the wet contaminated region.

The control method of the plurality of mobile robots may further include cleaning by the second mobile robot while the second mobile robot follows the first mobile robot after the second mobile robot completes the cleaning of the wet contaminated region.

Advantageous Effects

According to an embodiment of this disclosure, there are one or more of the following effects.

First, according to the present disclosure, each of a plurality of mobile robots having different cleaning manners divide an area that can be cleaned and an area that cannot be cleaned and thus the plurality of mobile robots can perform a proper cleaning according to a state of a cleaning area.

Second, according to the present disclosure, when a dry cleaner finds a wet contaminant during cleaning, the dry cleaner allows a wet cleaner specialized in cleaning of the wet contaminant to clean the wet contaminant. Thereby, a reduction in a suction rate of the dry cleaner and a damage of a filter of the dry cleaner generated due to a liquid inhale can be prevented. Also, the liquid can be effectively removed.

Third, according to the present disclosure, a wet contaminated region can be accurately specified by accurately detecting a liquid through using a dust sensor, a camera, or so on.

Fourth, according to the present disclosure, when a wet cleaner cleans a liquid having a high viscosity, cleaning can be repeatedly performed until the cleaning is completed, thereby performing perfect cleaning on the liquid.

Fifth, according to the present disclosure, a dry cleaner waits at a periphery of a wet contaminated region, and a wet cleaner specifies the wet contaminated region according to a communication signal strength with the dry cleaner. Accordingly, a problem that the wet cleaner does not find an exact location of the wet contaminated region, which may be generated only using a coordinate value, can be prevented.

Sixth, according to the present disclosure, a location of a wet contaminated can be found more accurately based on a communication signal strength value with a router and an image of a periphery of the wet contaminated region. Thus, even if the dry cleaner does other things, the wet cleaner can accurately move to the wet contaminated region.

Seventh, according to the present disclosure, when a dry cleaner specifies a wet contaminated region, the dry cleaner to back to the wet contaminated region with a wet cleaner after the dry cleaner completes the cleaning and the wet cleaner cleans the wet contaminated region. Accordingly, the dry cleaner does not need to transmit an obstacle map to the wet cleaner and the wet cleaner can accurately move to the wet contaminated region.

Eighth, according to the present disclosure, a plurality of cleaning maps having different types can efficiently and accurately match to each other by using artificial markers for the same space, which are collected by a plurality of mobile robots being different from each other.

The effects of the present disclosure are not limited to the above effects, and other effects that are not mentioned will be clearly understood by those skilled in the art from claims.

BRIEF DESCRIPTION OF DRAWINGS

FIG. 5b is a conceptual diagram showing an example of the network communication shown in FIG. 5a.

DETAILED DESCRIPTION

Figure 1:
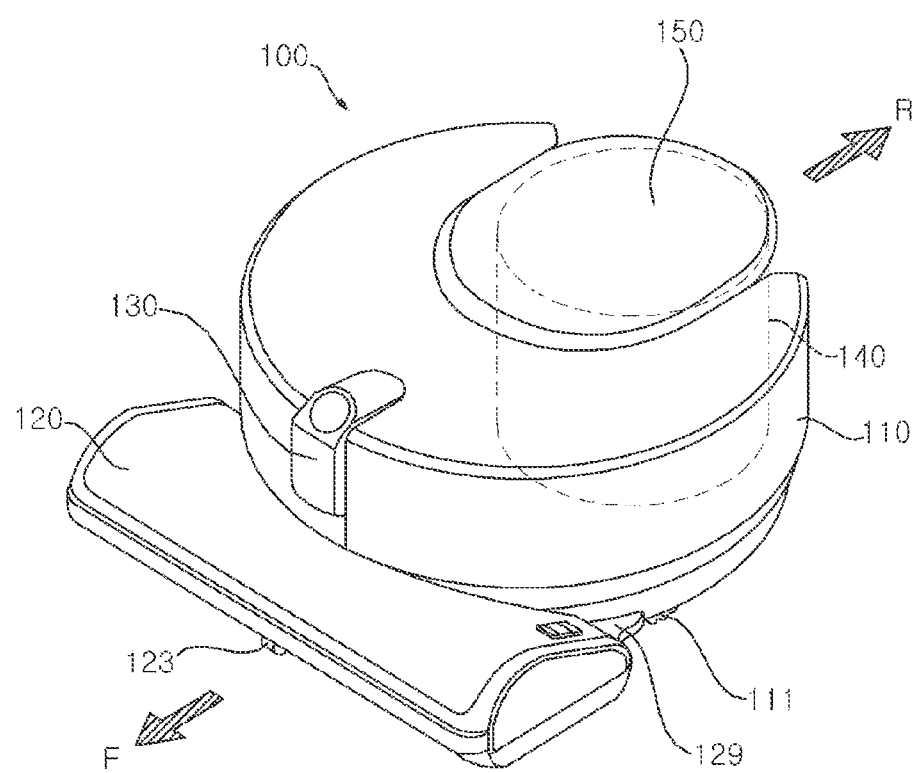
FIG. 1 is a perspective view showing an example of a robot cleaner according to a present disclosure.

The present disclosure will be clarified with reference to embodiments described below in detail together with the accompanying drawings. However, the present disclosure is not limited to the embodiments disclosed below, but may be implemented in various different forms. These embodiments are just provided to make the present disclosure complete, and to fully disclose the present disclosure to a person having ordinary skill in the art to which the present disclosure pertains. A scope of the present disclosure is only defined by claims. The same reference numerals refer to the same components, units, members, portions, or elements throughout the specification.

The terms spatially relative, "below", "beneath", "lower", "above" and "upper" and the like may be used to easily describe a correlation of elements with other elements. Spatially relative terms should be understood in terms of the directions shown in the drawings, including different directions of components at the time of use or operation. For example, when inverting an element shown in the drawings, an element described as "below" or "beneath" of another element may be placed "above" of another element. Thus, the exemplary term "below" may include both downward and upward directions. The elements may also be oriented in a different direction, so that spatially relative terms can be interpreted according to orientation.

Terms used herein is for describing embodiments and is not intended to restrict the present disclosure. In this specification, singular forms include plural forms unless a context clearly dictates otherwise. It is noted that terms "comprises" and/or "comprising" used in the specification mean that mentioned elements, steps, and/or operations do not exclude a presence or an addition of one or more of other elements, steps, and/or operations.

Unless defined otherwise, all terms (including technical and scientific terms) used herein may be used in a sense commonly understood by a person having ordinary skill in the art to which the present disclosure pertains. In addition, predefined and commonly used terms are not ideally or excessively interpreted unless explicitly defined otherwise.

In the drawings, a thickness or a size of each components, units, members, portions, or elements is exaggerated, omitted, or schematically shown for convenience and clarity. In addition, a size and area of each component, unit, member, portion, or element does not entirely reflect an actual size or area.

A mobile robot 100 according to the present disclosure may a robot capable of moving by itself using wheels or the like, and may be a home helper robot, a robot cleaner, or so on.

Hereinafter, a robot cleaner according to the present disclosure will be described in more detail with reference to the drawings.

Embodiments disclosed herein will be described in detail with reference to the accompanying drawings, but technical terms used in this specification are only used to describe specific embodiments and are not intended to limit the present disclosure.

Figure 2:
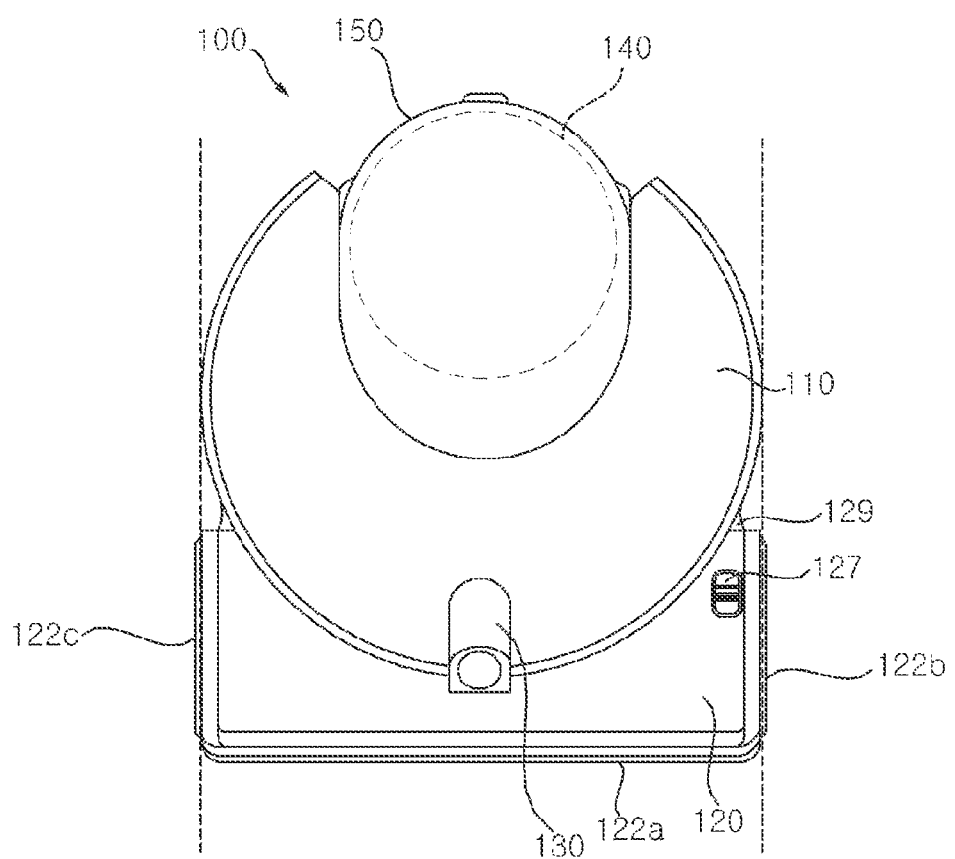
FIG. 2 is a plan view showing the robot cleaner shown in FIG. 1.
Figure 3:
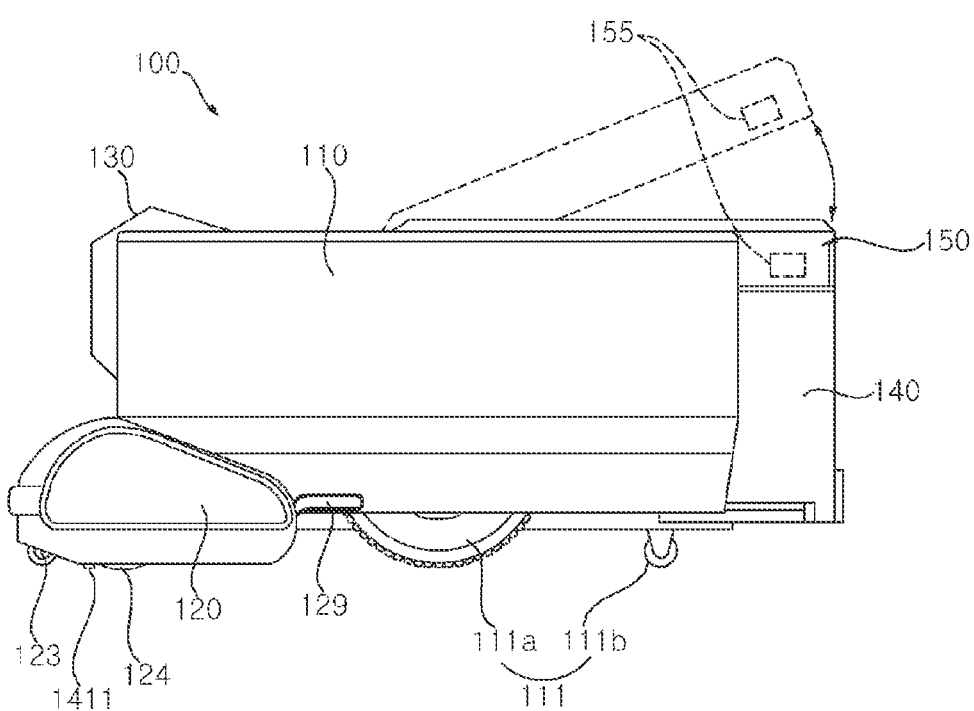
FIG. 3 is a side view showing the robot cleaner shown in FIG. 1.

FIG. 1 is a perspective view showing an example of a mobile robot 100 according to a present disclosure, FIG. 2 is a plan view showing the mobile robot 100 shown in FIG. 1, and FIG. 3 is a side view showing the mobile robot 100 shown in FIG. 1.

In this specification, a mobile robot, a robot cleaner, and a cleaner performing autonomous driving may be used in the same meaning. In addition, in this specification, a plurality of cleaners may include at least a part of components shown in FIGS. 1 to 3 or described below.

Referring to FIGS. 1 to 3, a mobile robot 100 performs a function of cleaning a floor while driving a certain area by itself. In this instance, the cleaning of the floor may include inhaling of a dust (including foreign material) on the floor or mopping the floor.

The mobile robot 100 may include a cleaner main body 110, a cleaning unit 120, a sensing unit 130, and a dust container 140. Various members or units including a controller 1800 for controlling the mobile robot 100 are built in or mounted on the cleaner main body 110. In addition, the cleaner main body 110 is provided with a wheel unit 111 for driving the mobile robot 100. By the wheel unit 111, the mobile robot 100 may be moved forward or backward, left and right, or rotated.

Referring to FIG. 3, the wheel unit 111 includes a main wheel 111*a* and a sub-wheel 111*b*.

The main wheels 111*a* are provided on both sides of the cleaner main body 110, respectively, and are configured to be rotatable in one direction or the other direction according to a control signal of the controller. The main wheels 111*a* may be configured to be driven independently of each other. For example, the main wheels 111*a* may be driven by different motors, respectively. Alternatively, the main wheels 111*a* may be driven by a plurality of different axes provided in one motor.

The sub-wheel 111*b* supports the cleaner main body 110 together with the main wheel 111*a*, and is configured to assist driving of the mobile robot 100 by the main wheel 111*a*. The sub-wheel 111*b* may also be provided in the cleaning unit 120, which will be described later.

The controller controls the driving of the wheel unit 111, and thus, the mobile robot 100 can autonomously drive the floor.

Meanwhile, a battery (not shown) for supplying power to the mobile robot 100 is mounted on the cleaner main body 110. The battery may be rechargeable and may be detachably attached to a lower portion or a bottom portion of the cleaner main body 110.

As shown in FIG. 1, the cleaning unit 120 may disposed in a form of protruding from one side of the cleaner main body 110 to suck air containing a dust or to mop. The one side may be a side in which the cleaner main body 110 travels in a forward direction F, that is, a front side of the cleaner main body 110.

In the drawings, it is shown that the cleaning unit 120 has a shape protruding toward a front side and both right and left sides at one side of the cleaner main body 110. Specifically, a front end portion of the cleaning unit 120 is disposed at a position spaced from one side of the cleaner main body 110 to the front direction, and both right and left end portions of the cleaning unit 120 are spaced from one side of the cleaner main body 110 to the left and right directions, respectively.

The cleaner main body 110 may have a circular shape and both sides of a rear end portion of the cleaning unit 120 protrude from the cleaner main body 110 to the left and right directions, respectively. Accordingly, an empty space, that is, a gap may be formed between the cleaner main body 110 and the cleaning unit 120. The empty space is a space between the left and right end portions of the cleaner main body 110 and the left and right end portions of the cleaning unit 120, and has a shape recessed toward an inside of the mobile robot 100.

When an obstacle is caught in the empty space, the mobile robot 100 may be caught by the obstacle and thus may not move due to the obstacle. To prevent this, a cover member 129 may be disposed to cover at least a portion of the empty space.

The cover member 129 may be provided on the cleaner main body 110 or the cleaning unit 120. In the embodiment, it is shown that cover members 129 are protruded at both sides of a rear end portion of the cleaning unit 120 to be disposed to cover an outer circumferential surface of the cleaner main body 110.

The cover member 129 is disposed to fill at least a portion of the empty space, that is, the empty space between the cleaner main body 110 and the cleaning unit 120. Therefore, the obstacle can be prevented from being caught in the empty space of the mobile robot 100, or the mobile robot 100 can have a structure being able to be easily separated from the obstacle even if the obstacle is caught in the empty space.

The cover member 129 protruding from the cleaning unit 120 may be supported by an outer circumferential surface of the cleaner main body 110. When the cover member 129 protrudes from the cleaner main body 110, the cover member 129 may be supported by a rear portion of the cleaning unit 120. According to the above structure, when the cleaning unit 120 hits an obstacle and receives an impact, a part of the impact is transmitted to the cleaner main body 110 and thus the impact can be distributed.

The cleaning unit 120 may be detachably coupled to the cleaner main body 110. When the cleaning unit 120 is separated from the cleaner main body 110, a mop module (not shown) may be detachably coupled to the cleaner main body 110 by replacing the separated cleaning unit 120.

Accordingly, the user may mount the cleaning unit 120 on the cleaner main body 110 when the user wants to remove a dust on a floor, and may mount a mop module on the cleaner main body 110 when the user wants to wipe the floor.

The embodiment may further include a liquid detection sensor for specifying a wet contaminated region. The liquid detection sensor may be disposed at a lower portion of a front side of the cleaning unit 120, may prevent a liquid from being sucked into the cleaning unit 120, and quickly detect the liquid so that the cleaner main body 110 is prevented from traveling over the liquid.

The liquid detection sensor may include various components for specifying a wet contaminated region. As an example, the liquid detection sensor may include a humidity sensor. The humidity sensor may be an electric resistance humidity sensor or a capacitive humidity sensor.

As another example, the liquid detection sensor may specify a wet contaminated region by using a change in electrical resistance when a sensing portion (not shown) touches water. It is preferable that the sensing portion of the liquid detection sensor may be disposed at a lower portion of a front side of the cleaning unit 120.

As another example, the liquid detection sensor may include a resistance wire and a conductive wire, and may be implemented in a manner that detects a short circuit generated in the resistance wire or the conductive wire by conductivity of a liquid.

When the cleaning unit 120 is mounted on the cleaner main body 110, the mounting may be guided by the above-described cover member 129. That is, since the cover member 129 is disposed to cover the outer circumferential surface of the cleaner main body 110, a relative position of the cleaning unit 120 with respect to the cleaner main body 110 may be determined.

The cleaning unit 120 may be provided with a caster 123. The caster 123 may assist the traveling of the mobile robot 100, and may support the mobile robot 100. A sensing unit 130 is disposed on the cleaner main body 110. As shown, the sensing unit 130 may be disposed at the one side of the cleaner main body 110 in which the cleaning unit 120 is located, that is, at a front side of the cleaner main body 110.

For example, the cleaning unit 120 may include a sweeping portion 124 that rotates around a rotation axis to sweep the floor and a motor (not shown) that supplies rotational force to the sweeping portion 124.

The sensing unit 130 may be disposed to overlap the cleaning unit 120 in a vertical direction of the cleaner main body 110. The sensing unit 130 is disposed on an upper portion of the cleaning unit 120 and detects an obstacle or a terrain feature at a front side so that the cleaning unit 120 positioned at the front side of the mobile robot 100 does not collide with the obstacle.

The sensing unit 130 may perform another sensing function other than the above detecting, perceiving, or sensing function. As an example, the sensing unit 130 may include a camera 131 for acquiring a periphery image. The camera 131 may include a lens and an image sensor. In addition, the camera 131 may convert a periphery image of the cleaner main body 110 into an electrical signal that can be processed by the controller 1800, and for example, may transmit an electrical signal corresponding to an upward image to the controller 1800. The electrical signal corresponding to the upward image may be used by the controller 1800 to detect a location of the cleaner main body 110.

In addition, the sensing unit 130 may detect an obstacle such as a wall, furniture, a cliff, or the like on a driving surface or a driving path of the mobile robot 100. In addition, the sensing unit 130 may detect a presence of a docking device that performs battery charging. In addition, the sensing unit 130 may detect ceiling information and map a cleaning area or a cleaning section of the mobile robot 100. In addition, the sensing unit 130 may acquire a floor image of a periphery of the cleaner main body 110.

A dust container 140 for separating and collecting a dust in the inhaled air may be detachably coupled to the cleaner main body 110. In addition, the dust container 140 is provided with a dust container cover 150 covering the dust container 140. In one embodiment, the dust container cover 150 may be hinged-coupled to the cleaner main body 110 to be rotated. The dust container cover 150 may be fixed to the dust container 140 or the cleaner main body 110 to maintain a state of covering an upper surface of the dust container 140. When the dust container cover 150 is disposed to cover an upper surface of the dust container 140, the dust container 140 may be prevented from being separated from the cleaner main body 110 by the dust container cover 150.

A portion of the dust container 140 may be accommodated in the dust container receiving portion, while the other portion of the dust container 140 may protrude toward a rear direction (that is, a reverse direction R opposite to a front direction F) of the cleaner main body 110.

The dust container 140 provides with an inlet through which air containing a dust flows and an outlet through which air separated from the dust is discharged. When the dust container 140 is mounted on the cleaner main body 110, the inlet and the outlet may communicate with opening 155 formed at an inner wall of the cleaning main body 110, respectively. Accordingly, an intake flow path and an exhaust flow path are positioned inside the cleaner main body 110.

According to the above connection, air containing a dust introduced through the cleaning unit 120 passes through the intake flow pass inside the cleaner main body 110 and flows into the dust container 140, and the air and the dust are separated from each other through passing a filter or a cyclone of the dust container 140. The dust is collected in the dust container 140. The air is discharged from the dust container 140, passes through the exhaust flow path inside the cleaner main body 110, and then, is finally discharged to an outside through the exhaust portion 112.

Hereinafter, an embodiment related to components (units, members, portions, or elements) of the robot cleaner 100 will be described with reference to FIG. 4.

A robot cleaner 100 or a mobile robot according to an embodiment of the present disclosure may include at least one of a communication unit 1100, an input unit 1200, a driving unit 1300, a sensing unit 1400, an output unit 1500, a power supply unit 1600, a memory 1700, a controller 1800, and a cleaning unit 1900 or a combination thereof.

Figure 4:
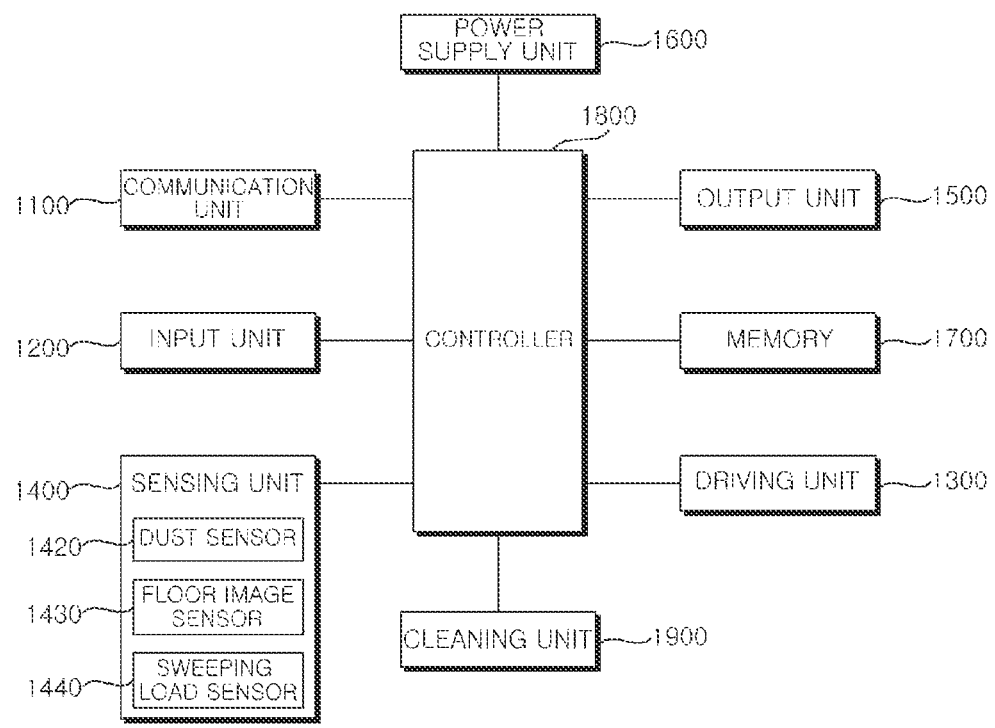
FIG. 4 is a block diagram showing exemplary components of a robot cleaner according to an embodiment of the present disclosure.

In the embodiment, components shown in FIG. 4 are not essential. Accordingly, a robot cleaner may include more or fewer component. Hereinafter, each component will be described. In addition, as described above, the same components of a plurality of robot cleaners described in the present disclosure may be only a part of components among the components described below. That is, a plurality of mobile robots may include different components.

Hereinafter, each component will be described. First, a power supply unit 1600 is provided with a battery that can be charged by an external commercial power to supply power to the mobile robot. The power supply unit 1600 may supply driving power to each of components included in the mobile robot, thereby supplying operation power required for the mobile robot to travel or perform a specific function.

In this instance, the controller 1800 may detect a remaining power of a battery, and control the mobile robot to move to a charging station connected to an external commercial power when the remaining power is insufficient so that the battery is charged by receiving a charging current from the charging station. The battery is connected to a battery detection unit so that a battery level and a charge state can be transmitted to the controller 1800. The output unit 1500 may display the remaining battery amount on a screen by the controller 1800.

The battery may be located at a lower portion of a center of the mobile robot or may be located on either a left or right side. In the latter case, the mobile robot may further include a counterweight in order to relieve a weight bias by the battery.

The controller 1800 may process information based on artificial intelligence technology. The controller 1800 may include one or more modules that perform at least one of information learning, information reasoning, information perception, and natural language processing.

The controller 1800 may perform at least one of learning, reasoning, and processing of a large amount of information (big data), such as information stored in the robot cleaner, environment information around the robot cleaner, and information stored in an external storage capable of communication with the robot cleaner, using machine running technology.

In addition, the controller 1800 predicts (or infers) at least one action or operation of the cleaner that is executable using the information learned using the machine learning technology, and controls the robot cleaner to execute the highest feasibility action among the at least one predicted action or operation. A machine learning technology is a technology that collects and learns a large amount of information based on at least one algorithm, and determines and predicts information based on the learned information.

Learning information is an operation of grasping characteristics, rules, and determining criteria of information, quantifying a relationship between information and another information, and predicting new data using the quantified pattern.

The algorithm used at the machine learning technology may be an algorithm based on statistics, for example, a decision tree that uses a tree structure as a prediction model, an artificial neural network that mimics a structure and function of a neural network in a living organism, genetic programming based on biological evolution algorithms, clustering of distributing observed examples into a subset called clusters, and a Monte Carlo method to calculate function values with a probability through randomized random numbers.

As a field of the machine learning technology, a deep learning technology performs at least one of learning, determining, and processing information using a deep neural network (DNN) algorithm. The deep neural network may have a structure that connects a layer and another layer and transfers data between layers. The deep learning technology can learn a large amount of information through a deep neural network using a graphic processing unit (GPU) optimized for parallel computation.

The controller 1800 may use training date stored in an external server or a memory and may be equipped with a learning engine that detects a feature or a characteristic for recognizing a predetermined figure. In this instance, a feature or a characteristic for recognizing a predetermined figure may include a size, a shape, and a shadow of the predetermined figure.

Specifically, when some of images obtained through a camera provided in the cleaner to the learning engine are input, the learning engine of the controller 1800 may recognize at least one object or living thing included in the input image. More specifically, in case of an object, the controller 1800 may recognize an object through an artificial marker using various methods.

As described above, when the learning engine is applied to the driving of the robot cleaner, the controller 1800 can recognize whether an obstacle such as a chair leg, an electric fan, or a certain type of a balcony gap that interferes with the driving of the robot cleaner exists around the robot cleaner or not. Accordingly, an efficiency and a reliability of driving the robot cleaner.

Meanwhile, the learning engine as described above may be mounted on the controller 1800 or may be mounted on an external server. When the learning engine is mounted on the external server, the controller 1800 may control the communication unit 1100 to transmit at least one image that is an analysis target to the external server.

The external server can recognize at least one object or living thing included in the corresponding image by inputting the image sent from the robot cleaner to the learning engine. In addition, the external server may transmit information related to a recognition result back to the robot cleaner. In this instance, the information related to the recognition result may include a number of figures included in the image that is the analysis target, and information related to a name of each figure.

On the other hand, the driving unit 1300 is provided with a motor. By driving the motor, left and right main wheels may be rotated in both directions to rotate or move a main body of the mobile robot. In this instance, the left and right main wheels may move independently. The driving unit 1300 may move the main body of the mobile robot in a forward, backward, left, and right directions, or may move the main body of the mobile through a curved driving or a rotating driving in place.

Meanwhile, the input unit 1200 receives various control commands for the robot cleaner from a user. The input unit 1200 may include one or more buttons. For example, the input unit 1200 may include a confirmation button, a setting button, or the like. The confirmation button is a button for receiving a command for confirming detection information, obstacle information, location information, and map information from a user, and the setting button is a button for receiving a command for setting the information from the user.

In addition, the input unit 1200 may include a input reset button for cancelling the previous user input and receiving an user input again, a delete button for deleting a preset user input, a button for setting or changing an operation mode, a button for receiving a command to return to the charging station, or so on.

In addition, the input unit 1200 may be a hard key, a soft key, a touch pad, or the like, and the input unit 1200 may be installed on an upper portion of the mobile robot. In addition, the input unit 1200 may have a form of a touch screen together with the output unit 1500.

Meanwhile, an output unit 1500 may be installed on an upper portion of the mobile robot. An installation location or an installation type may be variously changed. For example, the output unit 1500 may display a battery state or a driving method on the screen.

Also, the output unit 1500 may output status information of the mobile robot detected by the sensing unit 1400, for example, a current status of each component included in the mobile robot. In addition, the output unit 1500 may display external state information, obstacle information, location information, map information, or so on detected by the sensing unit 1400 on a screen.

The output unit 1500 may include any one of a light emitting diode (LED), a liquid crystal display (LCD), a plasma display panel (PDP), and an organic light emitting diode (OLED).

The output unit 1500 may further include a sound output member for aurally outputting an operation process or an operation result of the mobile robot performed by the controller 1800. For example, the output unit 1500 may output a warning sound to the outside according to a warning signal generated by the controller 1800.

In this instance, the sound output member (not shown) may be a member for outputting sound such as a beeper, a speaker, or so on. The output unit 1500 may output audio data, message data, or so on having a predetermined pattern stored in the memory 1700 to an outside through a sound output member.

Accordingly, the mobile robot according to an embodiment of the present disclosure may output environmental information on a driving area on a screen or output sound related to the environmental information on the driving area through the output unit 1500. According to another embodiment, the mobile robot may transmit map information or environmental information to a terminal device through the communication unit 1100 so that the terminal device outputs an image or a sound to be output.

A control program for controlling or driving the mobile robot and data according to the control program may be stored in the memory 1700. In the memory 1700, audio information, image information, obstacle information, location information, map information, or the like may be stroded. Also, information related to a driving pattern may be stored in the memory 1700.

The memory 1700 mainly uses a non-volatile memory. In this instance, the non-volatile memory (NVM, NVRAM) is a storage device that can keep stored information even when power is not supplied, for example, read only memory (ROM), flash memory, a magnetic computer storage device (e.g., a hard disk, a diskette drive, a magnetic tape), an optical disk drive, a magnetic random access memory (a magnetic RAM), a phase-change random access memory (PRAM), or the like.

Meanwhile, the sensing unit 1400 may include at least one of an external signal detection sensor, a front detection sensor, a cliff detection sensor, a two-dimension (2D) camera sensor, a liquid detection sensor, a dust sensor, a floor image sensor, a sweeping load sensor, and a three-dimension (3D) camera sensor.

An external signal detection sensor may detect an external signal of the mobile robot. The external signal detection sensor may be, for example, an infrared ray sensor, an ultra-sonic sensor, a radio frequency (RF) sensor, or so on.

The mobile robot may confirm a location and a direction of the charging stand by receiving a guide signal generated by a charging stand through using the external signal detection sensor. In this instance, the charging stand may transmit the guide signal indicating a direction and a distance so that the mobile robot can return. That is, the mobile robot may return to the charging stand by receiving the signal transmitted from the charging stand, determining a current location, and setting a movement direction.

On the other hand, front detection sensors may be installed at a front side of the mobile robot, specifically, along an outer circumferential surface of the mobile robot at regular intervals. The front detection sensor may be located on at least one side of the mobile robot to detect an obstacle in a front side. The front detection sensor may detect a figure, particularly, an obstacle, present in a movement direction of the mobile robot and thus transmit detection information to the controller 1800. That is, the front detection sensor may detect a projecting object, and fixtures, furniture, a wall surface, a wall edge, and the like in a house, which exist on a movement path of the mobile robot, and transmit the information to the controller 1800.

The front detection sensor may be, for example, an infrared sensor, an ultrasonic sensor, a radio frequency sensor, a geomagnetic sensor, etc., and the mobile robot may use one type of sensor as the front detection sensor or two or more types of sensors together as required.

As an example, an ultrasonic sensor may be mainly used to detect a long-distance obstacle. The ultrasonic sensor may include a transmitter and a receiver. The controller 1800 may determine whether an obstacle is present or not based on whether ultrasonic wave emitted from the transmitter is reflected by an obstacle or the like and thus is received at the received or not. Also, the controller 1800 also may calculate a distance from the obstacle using an ultrasonic emission time and an ultrasonic reception time.

In addition, the controller 1800 may compare ultrasound wave emitted from the transmitter and ultrasound wave received at the receiver to detect information related to a size of an obstacle. For example, as more ultrasonic waves are received at the receiver, the controller 1800 may determine that a size of an obstacle is greater.

In one embodiment, a plurality of (e.g., five (5)) ultrasonic sensors may be installed along an outer circumferential surface on a front side of the mobile robot. In this instance, preferably, transmitters and receivers of the ultrasonic sensors may be alternately installed on the front surface of the mobile robot.

That is, transmitters may be arranged to be spaced apart from a front center of a main body to a left side and a right side, and one or more transmitters may be disposed between receivers to form a reception area of an ultrasonic signal reflected by an obstacle or the like. With this arrangement, the reception area can be expanded while reducing a number of sensors. A transmission angle of ultrasonic wave may maintain an angle within a range that does not affect different signals to prevent a crosstalk phenomenon. Also, reception sensitivity of the receiver may be set differently.

In addition, the ultrasonic sensor may be installed upward by a predetermined angle so that ultrasonic wave transmitted from the ultrasonic sensor is output upward. In this instance, a blocking member may be further included to prevent the ultrasonic wave from radiating downward.

Meanwhile, as described above, two or more types of sensors may be used together as the front detection sensor. The front detection sensor may use any one type of sensor, such as an infrared sensor, an ultrasonic sensor, or an RF sensor.

As an example, the front detection sensor may include an infrared sensor as another type of sensor besides an ultrasonic sensor. The infrared sensor may be installed on an outer circumstantial surface of the mobile robot together with the ultrasonic sensor. The infrared sensor may also detect an obstacle positioned at a front side or a lateral side and transmit obstacle information to the controller 1800. That is, the infrared sensor may detect a projecting object, and fixtures, furniture, a wall surface, a wall edge, and the like in a house, which exist on a movement path of the mobile robot, and transmit the information to the controller 1800. Therefore, a main body of the mobile robot can move within a specific area without colliding with an obstacle.

On the other hand, a cliff detection sensor may detect an obstacle on a floor supporting the main body of the mobile robot by mainly using various types of optical sensors. That is, the cliff detection sensor may be installed on a bottom surface or a rear surface of the mobile robot facing the floor. Alternatively, the cliff detection sensor may be installed at a different location depending on a type of the mobile robot.

The cliff detection sensor is located on the bottom surface or the rear surface of the mobile robot to detect an obstacle on the floor. The cliff detection sensor may be an ultrasonic sensor, an RF sensor, and a position sensitive detector (PSD), and an infrared sensor equipped with a light emitting portion and a light receiving portion, like an obstacle detection sensor.

As an example, any one of the cliff sensing sensors may be installed in a front side of the mobile robot, and the other two cliff sensing sensors may be installed relatively in a back side. For example, the cliff detection sensor may be a PSD sensor, but may also include a plurality of different types of sensors.

A PSD sensor detects a short-distance and long-distance position of an incident light by one p-n junction using a semiconductor surface resistance. The PSD sensor includes a one-dimensional PSD sensor that detects light in only one axis and a two-dimensional PSD sensor that detects a light position on a plane. The one-dimensional PSD sensor or the two-dimensional PSD sensor may have a pin photodiode structure. The PSD sensor is a type of infrared sensor. That is, the PSD sensor uses infrared rays, particularly, the PSD sensor measure a distance by measuring an angle of received infrared rays reflected at an obstacle after the infrared rays transmit. That is, the PSD sensor calculates a distance from an obstacle using a triangulation method.

The PSD sensor may include a light emitting portion that emits infrared rays on an obstacle and a light receiving portion that receives infrared rays reflected at the obstacle and returned to the light receiving portion. The PSD sensor including the light emitting portion and the light receiving portion may be a module type. When an obstacle is detected using the PSD sensor, a stable measurement value can be obtained regardless of a difference in reflectivity and color of the obstacle.

The cleaning unit 1900 may clean a designated cleaning area according to a control command delivered from the controller 1800. The cleaning unit 1900 may scatter a periphery dust through a brush (not shown) that scatters the dust in the designated cleaning area, and then, drive a suction fan and a suction motor to suck the scattered dust. In addition, the cleaning unit 1900 may mop or wipe the designated cleaning area according to a replacement of components.

In addition, the controller 1800 may detect a cliff and analyze a depth of the cliff by measuring an infrared angle between an emission signal of infrared ray emitted by a cliff detection sensor toward the ground and a received signal reflected at the obstacle.

Meanwhile, the controller 1800 may determine whether the mobile robot can pass a cliff or not considering a ground state of a cliff detected using the cliff detection sensor, and may determine whether to pass the cliff or not according to the determination result. For example, the controller 1800 determines a presence or an absence of a cliff and a depth of the cliff through the cliff detection sensor, and then, allows the mobile robot to pass through the cliff only when a reflection signal is detected through the cliff detection sensor. As another example, the controller 1800 may determine a lifting phenomenon of the mobile robot using a cliff detection sensor.

Meanwhile, a two-dimensional camera sensor is provided on one surface of the mobile robot to obtain image information related to a circumstance of the main body during movement. An optical flow sensor generates image data having a predetermined format by converting a downward image input from an image sensor provided in the sensor. The generated image data may be stored in a memory 1700.

Also, one or more light sources may be installed adjacent to the optical flow sensor. At least one light source irradiates light to a predetermined area of or the ground (a floor) photographed by an image sensor. That is, when the mobile robot moves a specific area along the ground, if the ground is flat, a certain distance is maintained between the image sensor and the ground.

On the other hand, when the mobile robot moves the ground of the non-uniform surface, a distance between the image sensor and the ground is more than a certain distance due to irregularities and obstacles on the ground. In this instance, one or more light sources may be controlled by the controller 1800 to adjust an amount of light to be irradiated. The light source may be a light emitting device capable of adjusting an amount of light, for example, a light emitting diode (LED).

Using the optical flow sensor, the controller 1800 may detects a location of the mobile robot regardless of sliding of the mobile robot. The controller 1800 may compare and analyze image data photographed by the optical flow sensor over time to calculate a moving distance and a movement direction, and based on this, calculate a location of the mobile robot. By using the image information on the lower side of the mobile robot using the optical flow sensor, the controller 1800 may correct the location of the mobile robot stably with respect to sliding, rather than a location of the mobile robot calculated by other means.

The 3D camera sensor may be attached to a surface or a portion of the main body of the mobile robot and generate 3D coordinate information related to a periphery of the main body. That is, the 3D camera sensor may be a 3D depth camera that calculates a perspective distance between a mobile robot and an object or a subject to be photographed.

Specifically, the 3D camera sensor may photograph a 2D image related to a periphery of the main body and generate a plurality of 3D coordinate information corresponding to the 2D image.

In one embodiment, the 3D camera sensor has a stereo vision type. That is, the 3D camera may include two or more cameras for obtaining an existing 2D image and combine 2 or more images obtained from the 2 or more cameras to generate 3D coordinate information.

Specifically, the 3D camera sensor according to the embodiment may include a first pattern irradiation portion, a second pattern irradiation portion, and an image acquisition portion. The first pattern irradiation portion may irradiate light of a first pattern downward toward a front side of the main body. The second pattern irradiation portion may irradiate light of a second pattern upward toward the front side of the main body. The image acquisition portion may acquire an image of the front side of the main body. Accordingly, the image acquisition portion may acquire an image of a region in which the light of the first pattern and the light of the second pattern are incident.

In another embodiment, a 3D camera sensor may include an infrared pattern emitting portion that irradiates an infrared pattern, with a single camera. The 3D camera sensor may capture a shape in which an infrared pattern irradiated from the infrared pattern emitting portion is irradiated onto an object to a subject to be photographed. Thereby, a distance between the 3D camera sensor and the object or the subject to be photographed can be measured. The 3D camera sensor may be a 3D camera sensor of an infrared (IR) type.

In another embodiment, a 3D camera sensor may include a light emitting portion that emits light, together with a single camera. The 3D camera sensor may receive a part of a laser reflected at an object or a subject to be photographed among a laser emitted from the light emitting portion and analyze the received laser. Thereby, a distance between the 3D camera sensor and the object or the subject to be photographed can be measured. The 3D camera sensor may have a time of flight (TOF) type.

Specifically, the laser of the 3D camera sensor as described above may irradiate a laser extending in at least one direction. In one example, the 3D camera sensor may include first and second lasers, the first laser may irradiate linear lasers intersecting each other, and the second laser may irradiate a single linear laser. According to this, the lowermost laser is used to detect an obstacle at a bottom portion, the uppermost laser is used to detect an obstacle at an upper portion, and an intermediate laser between the lowermost laser and the uppermost laser is used to detect an obstacle in a middle portion.

A dust sensor 1420 measures a dust concentration in the air sucked by the cleaning unit. The dust sensor 1420 may be an optical sensor or the like.

The floor image sensor may be a camera that acquires or obtain an image of the floor at a periphery of the main body. The floor image sensor may be installed at a front end of the cleaning unit 120 or may constitute a part of the sensing unit 130 installed at the front end of the main body.

A sweeping load sensor 1440 measures a load of the sweeping portion 124. Specifically, the sweeping load sensor 1440 may measure a load of a motor connected to the sweeping portion 124.

On the other hand, the communication unit 1100 may be connected to a terminal device and/or other device located in a specific area through one communication method of wired, wireless, satellite communication methods to transmit and receive signals and data. In this specification, a term of 'other device' is used interchangeably with a term of 'a home appliance' or 'the home appliance'.

The communication unit 1100 may transmit and receive data with other device located in a specific area. In this instance, the other device may be any device that can be connected to a network to transmit and receive data. For example, the other device may be a device such as an air conditioning device, a heating device, an air purification device, a light fixture, a television, an automobile, or so on. Further, the other device may be a device that controls a door, a window, a water valve, a gas valve, or the like. Further, the other device may be a sensor that detects temperature, humidity, air pressure, gas, or the like.

Also, the communication unit 1100 may communicate with another mobile robot 100b located within a specific area or a predetermined range.

Figure 5A:
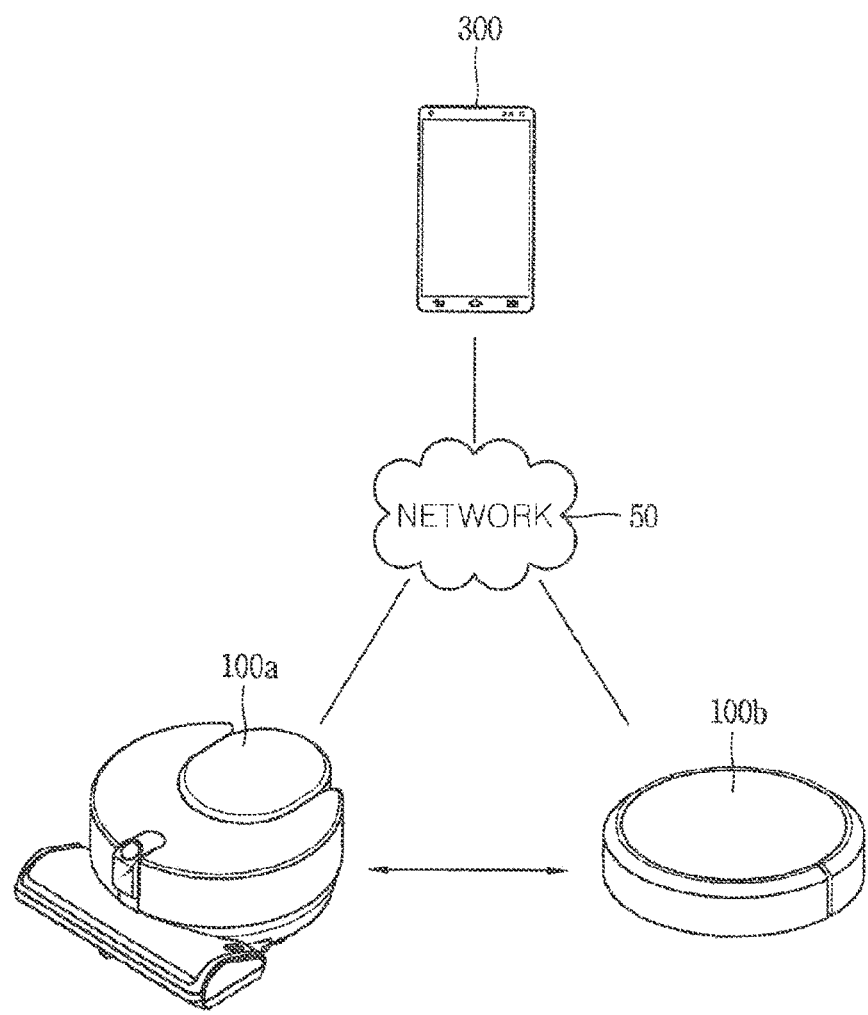
FIG. 5a is a conceptual diagram showing a network communication between a plurality of robot cleaners according to an embodiment of the present disclosure.
Figure 5B:
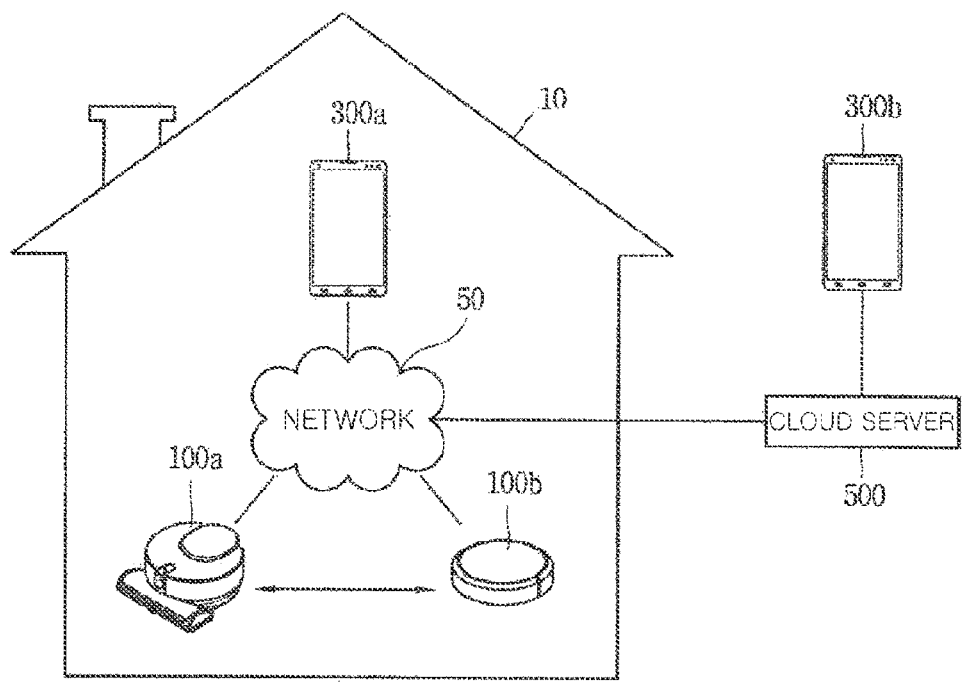

Referring to FIGS. 5a and 5b, a first mobile robot 100a and a second mobile robot 100b performing autonomous driving may exchange data with each other through a network communication 50. In addition, by a control command received from the network communication 50 or a terminal 300 through other communication, the first mobile robot 100a and/or the second mobile robot 100b performing autonomous driving performs operations related to cleaning or an operation corresponding to the control command.

That is, although not shown, a plurality of mobile robots 100a and 100b performing autonomous driving may communicate with the terminal 300 through a first network communication and may communicate with each other through a second network communication.

In this instance, the network communication 50 may short-range communication using at least one of wireless communication technologies, such as, a Wireless LAN (WLAN), a Wireless Personal Area Network (WPAN), a Wireless-Fidelity (Wi-Fi), a Wireless Fidelity (Wi-Fi) Direct, a Digital Living Network Alliance (DLNA), a Wireless Broadband (WiBro), a World Interoperability for Microwave Access (WiMAX), Zigbee, Z-wave, Blue-Tooth, Radio Frequency Identification (RFID), Infrared Data Association (IrDA), Ultrawide-Band (UWB), Wireless Universal Serial Bus (Wireless USB), or so on.

The network communication 50 may vary depending on communication methods of the mobile robots to communicate with each other.

In FIG. 5a, the first mobile robot 100a and/or the second mobile robot 100b performing autonomous driving transmits information sensed through each sensing unit to a terminal 300 through the network communication terminal 50. In addition, the terminal 300 may transmit a control command generated based on the received information to the first mobile robot 100a and/or the second mobile robot 100b through the network communication 50.

In addition, in FIG. 5a, a communication unit of the first mobile robot 100a and a communication unit of the second mobile robot 100b may directly wirelessly communicate or indirectly wirelessly communicate through another router (not shown) or so on. Thereby, information on locations and driving condition of the first and second mobile robots 100a and 100b can be confirmed with each other.

In one example, the second mobile robot 100b may perform a driving operation and a cleaning operation according to a control command received from the first mobile robot 100a. In this case, it may be said that the first mobile robot 100a operates as a master and the second mobile robot 100b operates as a slave.

Alternatively, it may be said that the second mobile robot 100b follows the first mobile robot 100a. Alternatively, in some cases, it may be said that the first mobile robot 100a and the second mobile robot 100b cooperate or collaborate with each other.

A system including a plurality of mobile robots 100a and 100b performing autonomous driving according to an embodiment of the present disclosure will be described with reference to FIG. 5b.

Referring to FIG. 5b, a cleaning system according to an embodiment of the present disclosure may include a plurality of mobile robots 100a and 100b that perform autonomous driving, a network communication 50, a server 500, and a plurality of terminals 300a and 300b.

Among them, a plurality of mobile robots 100a and 100b, a network communication 50, and at least one terminal 300a are located inside a building 10, and the other terminal 300b and the server 500 may be located outside the building 10.

Each of the plurality of mobile robots 100a and 100b is a cleaner that performs cleaning while driving on its own and thus performs autonomous driving and autonomous cleaning. A plurality of mobile robots 100a and 100b, in addition to the driving and the cleaning, may be provided with a communication unit 1100 therein, respectively.

In addition, a plurality of mobile robots 100a and 100b, a server 500, and a plurality of terminals 300a and 300b may be connected to each other through a network communication 50 to exchange data with each other. To achieve this, although not shown, a wireless router such as an access point (AP) device may be further included. In this case, the terminal 300a located at an internal network may perform monitoring, remote control, and the like for the cleaner by accessing at least one of the plurality of mobile robots 100a and 100b through the AP device. In addition, the terminal 300b located at an external network may also perform monitoring, remote control, and the like for the cleaner by accessing at least one of the plurality of mobile robots 100a and 100b through the AP device.

The server 500 may be wirelessly connected directly through the mobile terminal 300b. Alternatively, the server 500 may be connected to at least one of the plurality of mobile robots 100a and 100b without the mobile terminal 300b.

The server 500 may include a programmable processor and may include various algorithms. As an example, the server 500 may include algorithms related to performing of machine learning and/or data mining.

As another example, the server 500 may include a voice recognition algorithm. Then, upon receiving a voice data, the server may convert the received voice data into a data of text type and then output the data of text type.

Firmware information and driving information (such as course information) on the plurality of cleaners 100a and 100b may be stored in the server 500 and product information on the plurality of cleaners 100a and 100b may be registered to the server 500. For example, the server 500 may be a server operated by a manufacturer of the cleaner or may be a server operated by an operator of an open application store.

As another example, the server 500 may be a home server which is provided in a home and where status information on home appliances or content shared by home appliances is stored. When the server 500 is a home server, information related to a foreign material, for example, a foreign material image, may be stored.

On the other hand, a plurality of mobile robots 100a and 100b may be wirelessly connected directly to each other through Zigbee (Zigbee), Zwave, Bluetooth, ultra-wideband wireless technology, or so on. In this case, the plurality of mobile robots 100a and 100b may exchange location information and driving information with each other.

In this instance, one of the plurality of mobile robots 100a and 100b may be a master mobile robot 100a, the other may be a slave mobile robot 100b. For example, the first mobile robot 100a may be a dry cleaner that sucks a dust on the floor, and the second mobile robot 100b may be a wet cleaner that mops the floor cleaned by the first mobile robot 100a.

In addition, structures and specifications of the first mobile robot 100a and the second mobile robot 100b may be different from each other. In this case, the first mobile robot 100a may control driving and cleaning of the second mobile robot 100b. In addition, the second mobile robot 100b may perform driving and cleaning while following the first mobile robot 100a. In this instance, "the second mobile robot 100b performs driving and cleaning while following the first mobile robot 100a" means that the second mobile robot 100b performs driving and cleaning in a state that follows the first mobile robot 100a while maintaining an appropriate distance from the first mobile robot 100a.

Figure 5C:
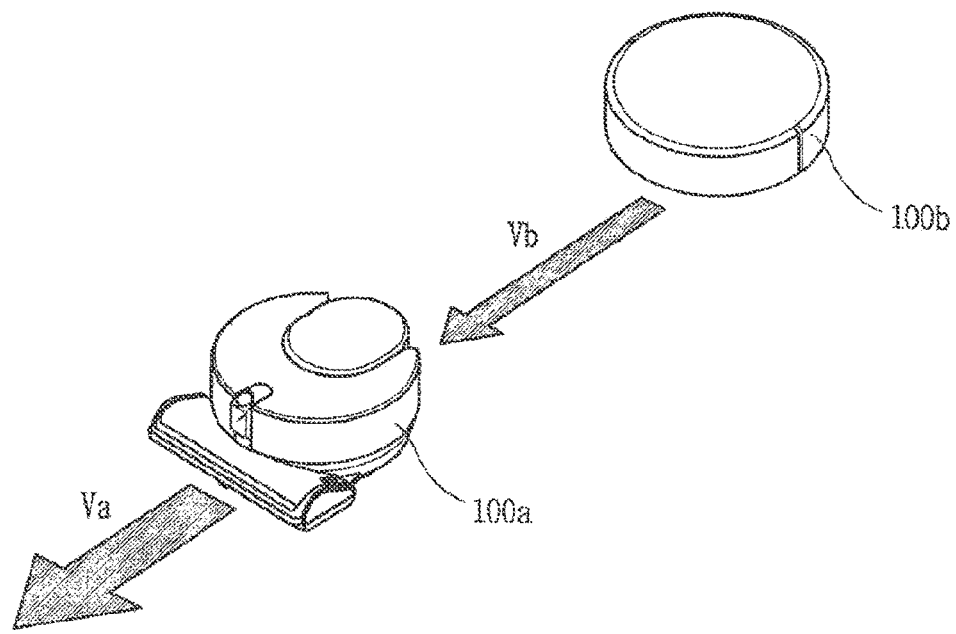
FIG. 5c is a view for showing a following control between a plurality of robot cleaners according to an embodiment of the present disclosure.

Referring to FIG. 5c, the first mobile robot 100a may control the second mobile robot 100b so that the second mobile robot 100b follows the first mobile robot 100a.

To achieve this, the first mobile robot 100a and the second mobile robot 100b may be located in a specific area to be able to communication with each other, and the second mobile robot 100b needs to grasp at least a relative location of the first mobile robot 100a.

As an example, relative locations of the first mobile robot 100a and the second mobile robot 100b may be grasped each other by exchanging IR signals, ultrasonic signals, carrier frequencies, and impulse signals with each other through a communication unit of the first mobile robot 100a and a communication unit of the second mobile robot 100b, analyzing them through triangulation, or so on, and calculating a displacement of the first mobile robot 100a and the second mobile robot 100b.

However, the location grasping or the positioning through the signal exchange is based on that the first mobile robot 100a and the second mobile robot 100b are each equipped with a position sensor or sufficiently close to each other. Accordingly, the present disclosure proposes a method for easily grasping relative locations of the first mobile robot 100a and the second mobile robot 100b each other within a designated space without having an additional position sensor and regardless of a distance between the first mobile robot 100a and the second mobile robot 100b.

When the relative locations of the first mobile robot 100a and the second mobile robot 100b are recognized as in the above, the second mobile robot 100b may be controlled based on map information stored in the first mobile robot 100a or map information stored in a server or a terminal. Also, the second mobile robot 100b may share obstacle information sensed by the first mobile robot 100a. In addition, the second mobile robot 100b may perform an operation by a control command (e.g., a control command related to driving or traveling, such as, a driving or traveling direction, a traveling speed, stop, etc.) received from the first mobile robot 100a.

Specifically, the second mobile robot 100b performs cleaning while driving or traveling along a driving or driving or traveling path of the first mobile robot 100a. However, a traveling direction of the first mobile robot 100a does not always coincident with a traveling direction the second mobile robot 100b. For example, when the first mobile robot 100a moves up/down/left/right or rotates, the second mobile robot 100b moves up/down/left/right or rotates after a predetermined time, and thus, the current traveling directions may be different.

In addition, a traveling speed Va of the first mobile robot 100a and a traveling speed Vb of the second mobile robot 100b may be different from each other. The first mobile robot 100a may control a traveling speed Va and/or Vb of the first mobile robot 100a and/or the second mobile robot 100b to be variable through considering a communicable distance between the first mobile robot 100a and the second mobile robot 100b.

For example, when the first mobile robot 100a and the second mobile robot 100b are moved apart by a predetermined distance or more, the first mobile robot 100a may control the second mobile robot 100b to be faster than before. In addition, when the first mobile robot 100a and the second mobile robot 100b are close by a predetermined distance or less, the first mobile robot 100a may control the second mobile robot 100b to be slower than before or to stop for a predetermined time. Through this, the second mobile robot 100b can perform cleaning while continuously following the first mobile robot 100a.

In addition, although not shown, the first mobile robot 100a and the second mobile robot 100b may operate to cooperatively or collaboratively clean in a state in which a designated space is divided. To achieve this, when the first mobile robot 100a and the second mobile robot 100b may have a cleaning history of the designated space at least once, each of the first mobile robot 100a and the second mobile robot 100b may have an obstacle map in which its location coordinate is displayed.

The obstacle map may include information related to an area of a specific space (e.g., a shape of an area, a location of a wall, a height of a floor, a position of a door, threshold, etc.), location information of the cleaner, location information of a charging station, and information related to an obstacle (e.g., a location, a size, etc. of an obstacle) in the specific space. In this instance, the obstacle may include a fixed obstacle, such as, a wall, a fixture, furniture, or so on protruding from a floor of a cleaning area B to prevent the traveling of the cleaner, and a moving obstacle, as well as a cliff.

The obstacle map held by or stored in the first mobile robot 100a and the obstacle map held by or stored in the second mobile robot 100b may be different. For example, when the first mobile robot 100a and the second mobile robot 100b have different types or have different obstacle sensors mounted thereon (e.g., an ultrasonic sensor, a laser sensor, a radiowave sensor, an infrared sensor, a bumper, etc.), different obstacle maps may be generated even if they are created for the same space.

In addition, in a memory 1700 of each of the first mobile robot 100a and the second mobile robot 100b, an obstacle map previously created for a designated space and map data related thereto may be stored before at least collaborative cleaning.

In this instance, each obstacle map may be implemented in a form of a 2D or 3D image or a grid map for a designated space. In addition, each obstacle map may include location information of its mobile robot (i.e., the first mobile robot 100a or the second mobile robot 100b) and location information of a wet contaminated region in a cleaning area (B), together with at least one obstacle information, for example, location information and size information such as a table, a wall, a threshold, or so on.

In addition, each obstacle map may be the same as a shape of the designated real space and may be generated to have the same scale as the real space based on actual values of a plan view.

Meanwhile, the first mobile robot 100a and the second mobile robot 100b may independently perform driving and cleaning in a designated space. However, if the first mobile robot 100a and the second mobile robot 100b may perform cleaning in a separate scenario rather than collaboration, a case that a driving trajectory of the first mobile robot 100a may overlap a driving trajectory of the second mobile robot 100b or so on may generate, and thus, it may be against a purpose of efficiently performing the cleaning using a plurality of mobile robots.

Accordingly, in the present disclosure, a plurality of mobile robots may recognize relative locations each other within a designated space without a position sensor in order to perform a collaborative/following cleaning operation.

Specifically, in the present disclosure, the first mobile robot 100a communicates with the second mobile robot 100b, and thus, the first mobile robot 100a receives an obstacle map where a location of the second mobile robot 100b and artificial markers are displayed from the second mobile robot 100b. Then, a coordination system of the received obstacle map of the second mobile robot 100b is unified to that of an obstacle map of the first mobile robot 100a by calibrating the received obstacle map of the second mobile robot 100b and the obstacle map of the first mobile robot 100a based on artificial markers. In addition, the first mobile robot 100a may recognize the relative location of the second mobile robot 100b by using the obstacle map of the second mobile robot 100b in which the coordinate system is unified. That is, in the present disclosure, as long as the first mobile robot 100a and the second mobile robot 100b each have an obstacle map for the same space, the first mobile robot 100a and the second mobile robot 100b can recognize relative locations within the same space, even if coordinate systems of maps of them are different due to different obstacle sensors, they are not close enough to send and receive short-range wireless signals to each other, or they do not have a position sensor.

Hereinafter, a control method and a control system of a plurality of robot cleaners according to an embodiment of the present disclosure will be described with reference to FIG. 6 as follows. A control method may be performed only by a controller 1800 or by a terminal 300 or a server 500 together with the controller 1800 according to an embodiment. A control system according to the present disclosure may be a computer program implementing each step of a control method or may be a recording medium on which a program for implementing the control method is recorded. In the specification, 'recording medium' means a recording medium readable by a computer. A control system according to the present disclosure may be a system including both hardware and software.

In some embodiments, functions mentioned in steps may occur out of sequence. For example, two steps successively shown may be performed substantially simultaneously or may be performed in reverse order depending on the corresponding function.

First, a plurality of mobile robots may be selected as a group in order to perform collaborative cleaning by the plurality of mobile robots, and the plurality of mobile robots may designate an area to be cleaned together.

Figure 6:
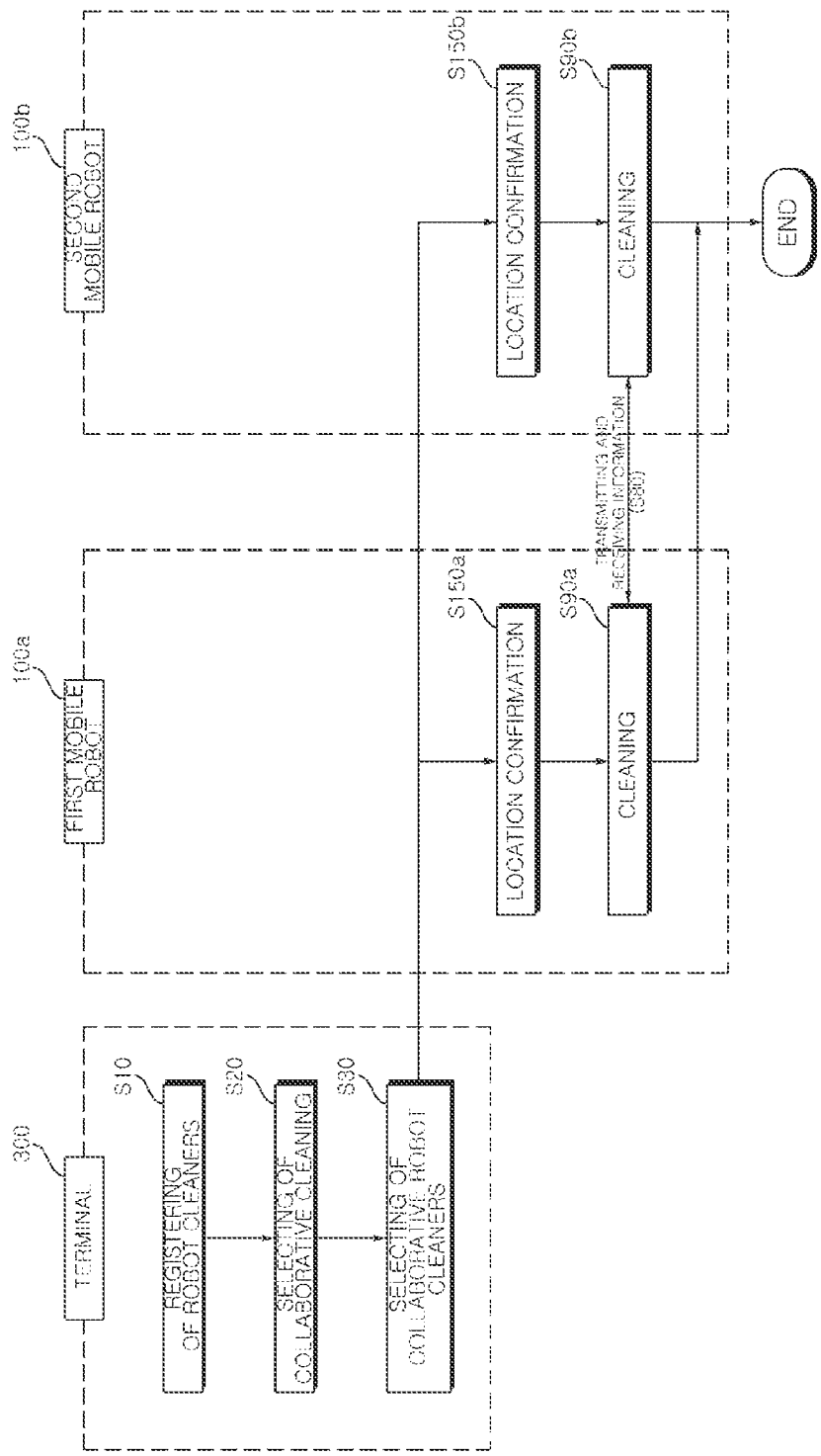
FIG. 6 is a representative flowchart showing a method of collaborative cleaning by a plurality of robot cleaners according to an embodiment of the present disclosure.

Specifically, referring to FIG. 6, a control method of a plurality of mobile robots may include a step S10 of registering a plurality of robot cleaners. The control method may include a step S20 in which a collaborative cleaning mode is selected and input by a user after the step S10. The control method may include a step S30 in which a plurality of robot cleaners to collaborate (which may be referred to as a plurality of collaborative robot cleaners) are selected and any one of a plurality of collaborative modes is selected after the collaborative cleaning is selected and input. The control method may include a step S90 in which the plurality of robot cleaners perform cleaning.

In the step S10 of registering of the robot cleaners, a plurality of robot cleaners 100a and 100b may be registered to a terminal 300. The plurality of robot cleaners 100a and 100b may be registered to the server 500.

A user may register a robot cleaner connectable on a network by touching a product registration input unit on a screen of the terminal 300. When the product registration is completed, the registered robot cleaners may be displayed on a screen of the terminal 300.

In the step S20 of selecting of the collaborative cleaning, the user may select a collaborative cleaning mode through the terminal 300. The step S30 may include a robot cleaner selection step S30 in which a plurality of collaborative robot cleaners to perform collaborative cleaning are selected among a plurality of registered robot cleaners.

For example, the user may select and input an option (a selection term) that a robot cleaner 1 becomes a first mobile robot 100a. In addition, in the step S30, the user may select a second mobile robot 100b among at least one option on a screen of a terminal 300. For example, the user may select and input an option that a robot cleaner 2 (a mop) becomes a second mobile robot 100b. In a second embodiment, which will be described later, a user may select and input only a main robot cleaner among a plurality of collaborative robot cleaners.

The step S30 may include a mode selection step S30 where any one of a plurality of collaborative modes is selected. The user may select any one of the plurality of options to correspond to a collaborative mode to be selected.

In the step S90 of cleaning, the plurality of collaborative robot cleaners 100a and 100b selected in the robot cleaner selection step S30 performs cleaning. In the step S90 of cleaning, the plurality of robot cleaners 100a and 100b performs cleaning according to the collaborative mode selected in the mode selection step S30.

In the robot cleaner selection step S30, the first mobile robot 100a and the second mobile robot 100b are selected among the plurality of registered robot cleaners. The first mobile robot 100a and the second mobile robot 100b refer to cleaners selected to perform collaborative cleaning. After the step S30, if the terminal 300 gives instructions to the first mobile robot 100a and the second mobile robot 100b through a network, each of the first mobile robot 100a and the second mobile robot 100b may confirm its location on a map by analyzing a current state (S150a, S150b). The first mobile robot 100a confirms its position (S150a) and performs collaborative cleaning with the second mobile robot 100b (S90a). The second mobile robot 100b confirms its position (S150b) and performs collaborative cleaning with the first mobile robot 100a (S90b). The first mobile robot 100a and the second mobile robot 100b transmit and receive information (S80) with each other while performing cleaning (S90a, S90b).

Hereinafter, a method of specifying a wet contaminated region according to an embodiment of the present disclosure will be described with reference to FIG. 7.

Figure 7A:
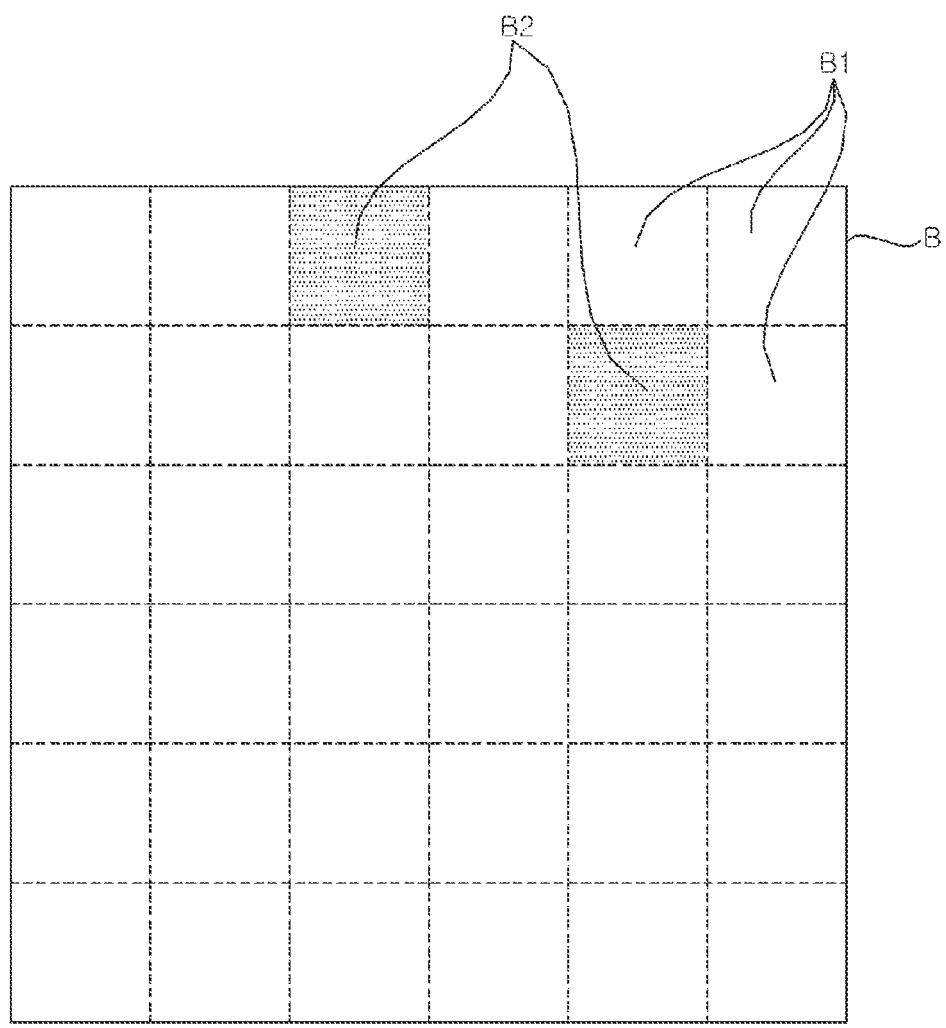
FIG. 7 is a view showing a method of specifying a wet contaminated area according to an embodiment of the present disclosure.
Figure 7B:
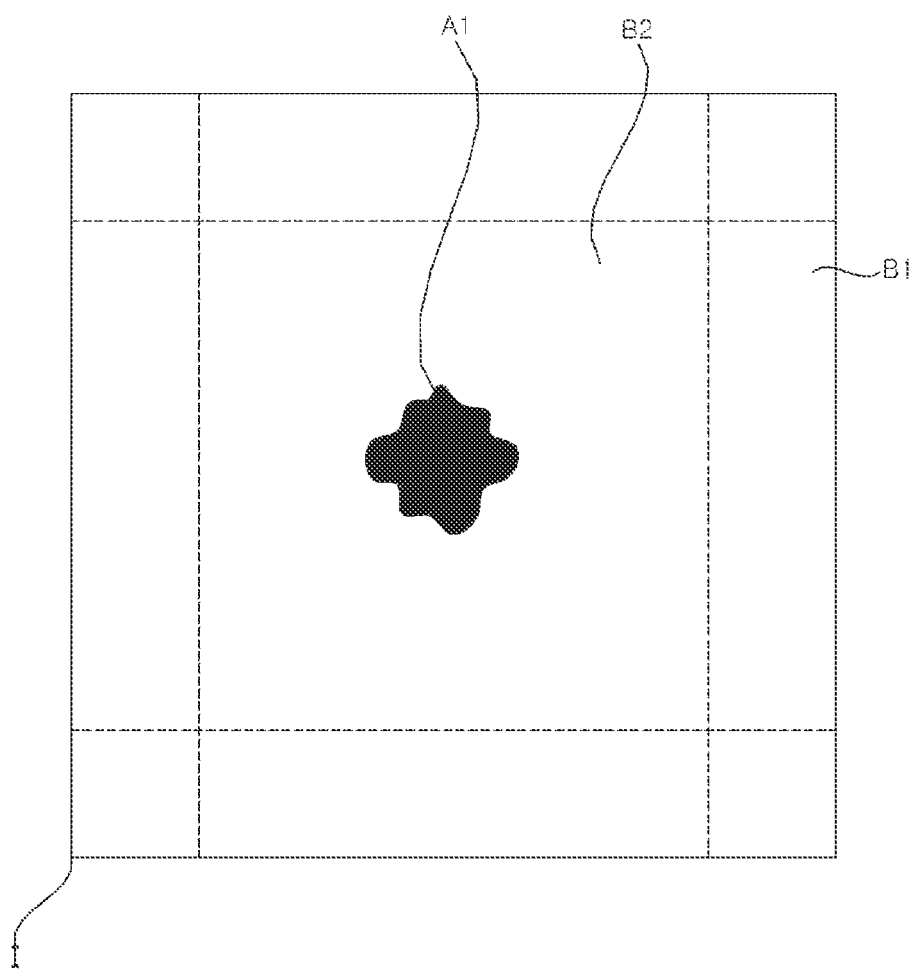

Referring to FIG. 7a, the first mobile robot 100a may specify a wet contaminated region and transmit location information of the wet contaminated region to the second mobile robot 100b. The first mobile robot 100a may transmit a floor image of the wet contaminated region to the terminal 300. The user may input a wet cleaning command to the second mobile robot 100b after confirming the floor image of the wet contaminated region output on the terminal 300.

A controller 1800 of the first mobile robot 100a may specify a wet contaminated region based on information input from a dust sensor 1420 and a floor image sensor.

Specifically, the controller 1800 may divide a cleaning area B into a plurality of cells B1 and B2, and specify at least one suspected wet contaminated region B2 where a dust concentration is relatively low in the cells B1 and B2 and a non-contaminated region B1, based on a dust concentration of the cells B1 and B2 of the cleaning area B input from the dust sensor 1420. More specifically, the controller 1800 may specify the suspected wet contaminated region B2 and the non-contaminated region B1 based on a preset dust concentration. An average dust concentration of the cells may be defined as a preset dust concentration.

In this instance, the wet contaminated region refers to a region in which a wet contaminant A1 exists or a hard or sticky contaminant by liquid hardening is located. A dust is adsorbed in the wet contaminated region, and a dust concentration sucked at the wet contaminated region is lower than a dust concentration sucked at a periphery of the wet contaminated region.

The controller 1800 may specify a region having a dust concentration higher than a preset dust concentration as a non-contaminated region B1, and a region having a dust concentration lower than a preset dust concentration as a suspected wet contaminated region B2. An average dust concentration of the cells may be defined as a preset dust concentration.

Referring to 7b, since it is difficult to accurately determine the wet contaminated region based only on the dust concentration, the controller 1800 may specify the suspected wet contaminated region B2 as a wet contaminated region based on a floor image of the suspected wet contaminated region B2.

Specifically, the controller 1800 may specify the wet contaminated region by comparing a floor image I of the suspected wet contaminated region B2 with a floor image of a periphery of the suspected wet contaminated region B2. In this instance, the floor image of the periphery of the suspected wet contaminated region B2 means a floor image of the non-contaminated region B1 at a periphery of the suspected wet contaminated region B2.

Specifically, the controller 1800 may specify a wet contaminated region by comparing at least one of a color, a shape, and a texture of the floor image of the suspected wet contaminated region B2 and at least one of a color, a shape, and a texture of the floor image of the periphery. The floor of the wet contaminated region may have a different color (dark color) from the peripheral floor, may have a lower reflectivity than the peripheral floor, and may have a shape different from a shape of the peripheral floor.

When the floor image of the suspected wet contaminated region B2 is different from the floor image of the periphery in at least one of a color, a shape, and a texture to a predetermined degree, the controller 1800 may specify the suspected wet contaminated region B2 as a wet contaminated region. The specifying of the wet contaminated region from the floor image may be learned by a deep learning method.

Figure 8:
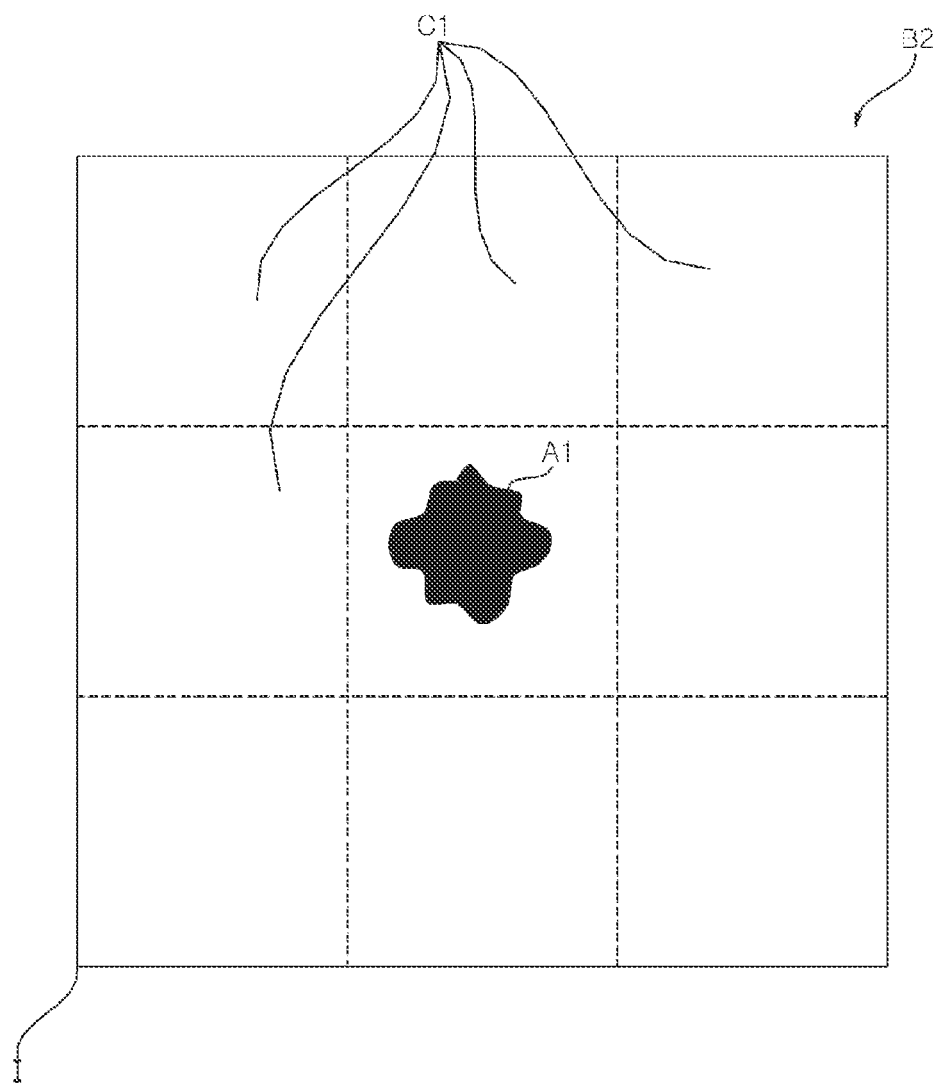
FIG. 8 is a view showing a method of specifying a wet contaminated area according to another embodiment of the present disclosure.

Referring to FIG. 8, in order to more accurately specify the wet contaminated region from the suspected wet contaminated region B2, the floor image of the suspected wet contaminated region B2 may be divided into a plurality of lower suspect regions C1 and comparing at least one of a color, a shape, and a texture of floor images of the plurality of lower suspect regions C1. Then, the controller 1800 may specify at least one of the plurality of lower suspect regions C1 as the wet contaminated region.

Specifically, the controller 1800 may specify at least one of the plurality of lower suspect regions C1 as the wet contaminated region by comparing at least one of a color, a shape, and a texture of floor images of the lower suspect area C1 and at least one of a color, a shape, and a texture of a floor image of a periphery.

By dividing the floor image of the suspected wet contaminated region B2 into a plurality of lower suspect regions C1 and comparing floor heights of the plurality of lower suspect regions C1 with floor height of a periphery, the controller 1800 may specify at least one of the plurality of lower suspect regions C1 having a floor height higher than a floor height of the periphery as the wet contaminated region.

A floor image of the suspected wet contaminated region B2 may be obtained when the first mobile robot 100a travels through an entire cleaning area B. Alternatively, after the first mobile robot 100a obtains a dust concentration while travelling through an entire cleaning area B, the first mobile robot 100a moves to the suspected wet contaminated region B2 and obtain the floor image of the suspected wet contaminated region B2.

For a more accurate determination, the first mobile robot 100a may specify the suspected wet contaminated region B2 as a wet contaminated region, based on the floor image of the suspected wet contaminated region B2 and a load of a sweeping portion 124 at the suspected wet contaminated region B2.

Specifically, the controller 1800 specifies the wet contaminated region based on the floor image and drives the sweeping portion 124 in the wet contaminated region. When a load of the sweeping portion 124 exceeds a preset load value, the controller 1800 may determines the region as a wet contaminated region. When the load of the sweeping portion 124 is equal to or less than a preset load value, the controller 1800 may determines that the region is not the wet contaminated region.

Hereinafter, a case where a wet contaminated region is detected in a cleaning area B during a collaborative cleaning will be described.

Referring to FIGS. 9a to 9d, and FIG. 10, a control method of a plurality of robot cleaners according to a first embodiment of the present disclosure may include a step S110 in which a first mobile robot 100a specifies a wet contaminated region in a cleaning area B, a step S113 of transmitting an obstacle map including location information of the wet contaminated region and a cleaning command for the wet contaminated region to the second mobile robot 100b when the first mobile robot 100a specifies the wet contaminated region, steps S115 and S120 in which the second mobile robot 100b moves to the wet contaminated region when the second mobile robot 100b receives the cleaning command for the wet contaminated region, and a step S130 in which the second mobile robot 100b cleans the wet contaminated region.

Figure 9A:
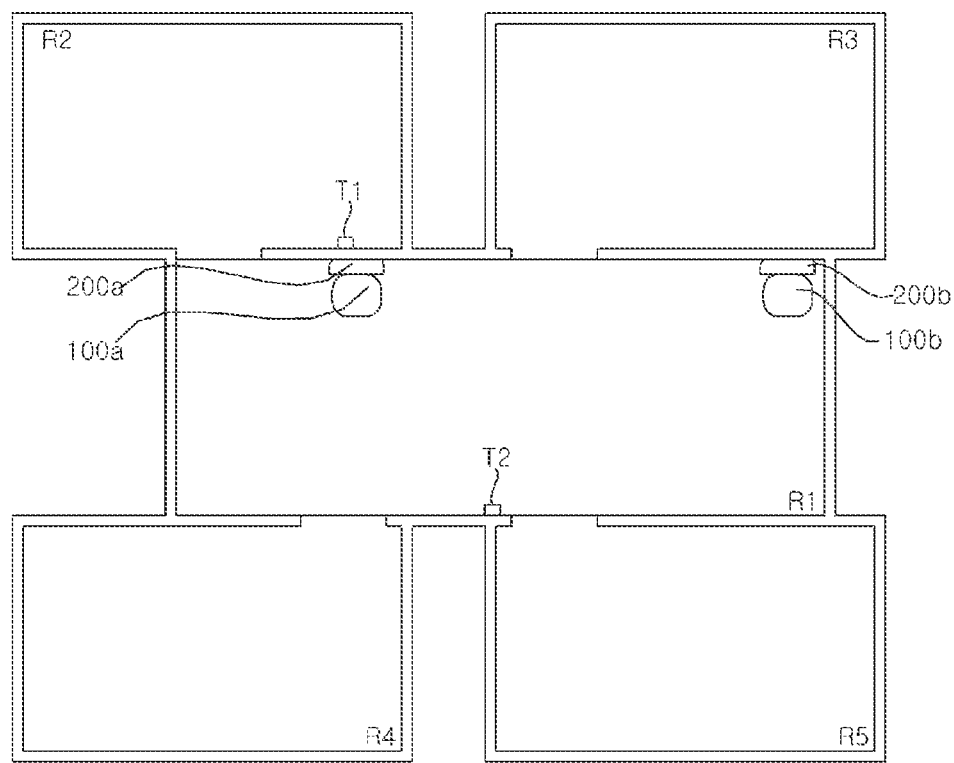
FIGS. 9a to 9d is a conceptual diagram showing a collaborative cleaning by a plurality of robot cleaners according to an embodiment of the present disclosure.
Figure 9B:
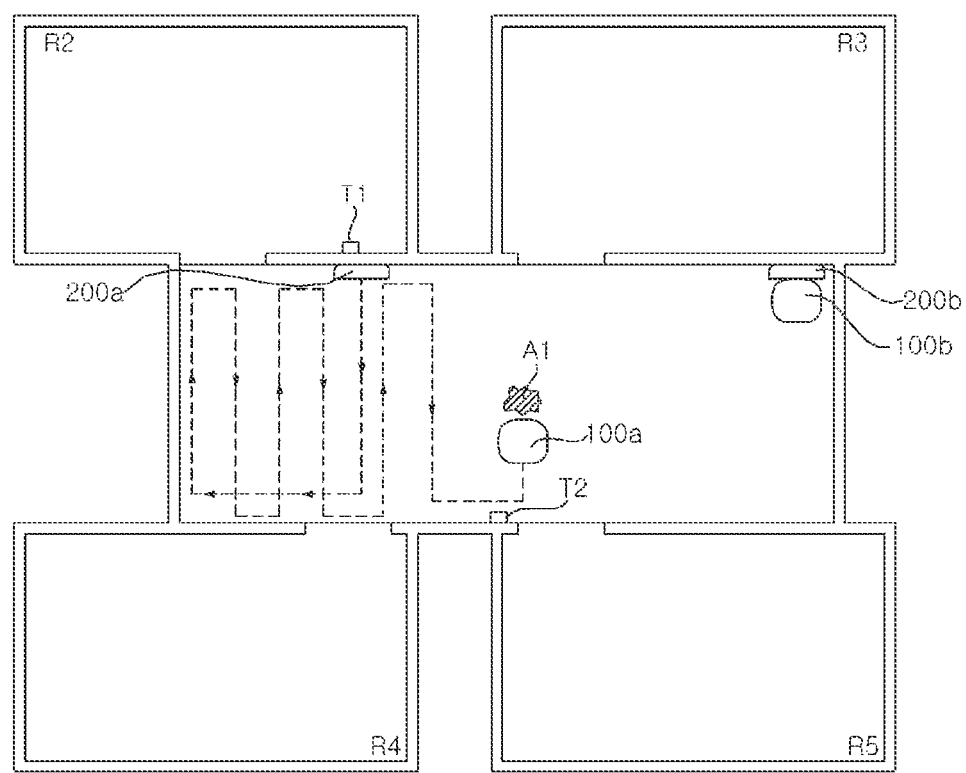
Figure 10:
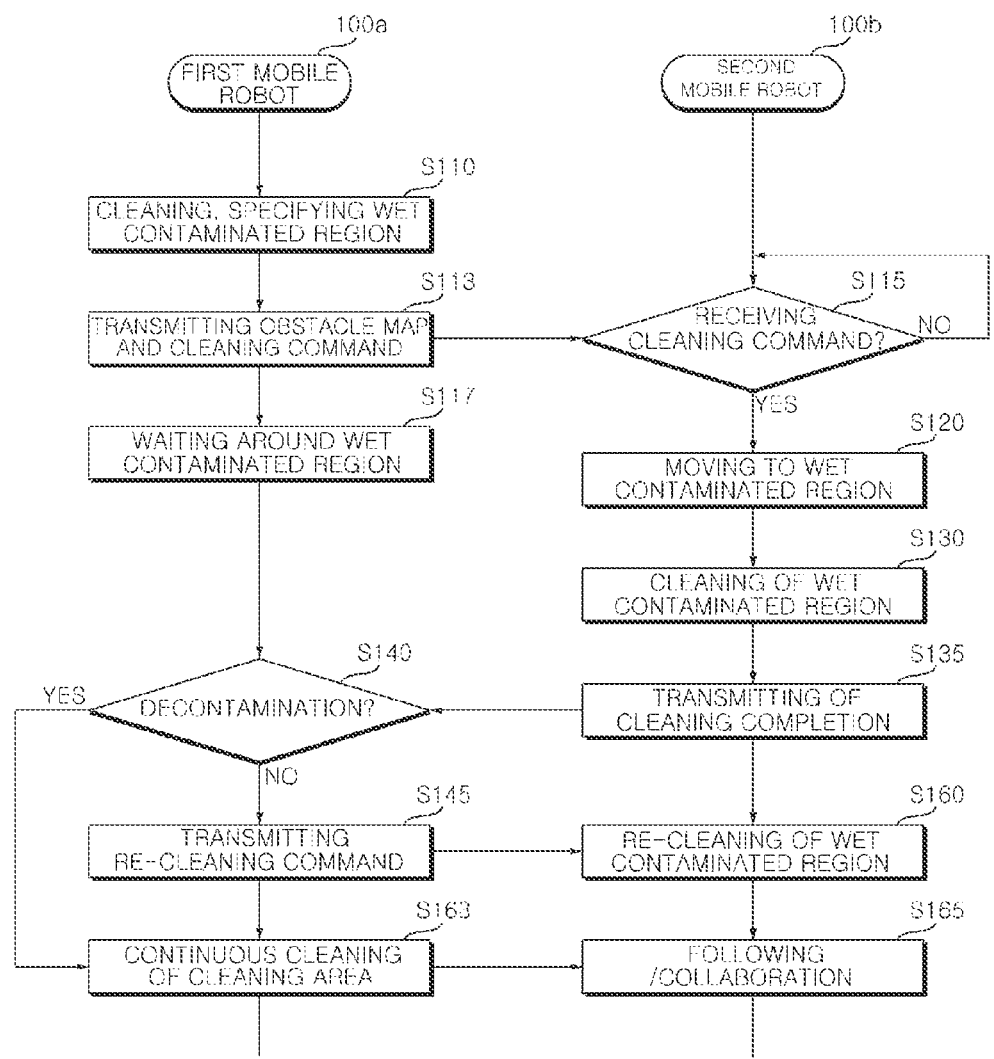
FIG. 10 is a flowchart of a control method of a plurality of robot cleaners according to a first embodiment of the present disclosure.

Referring to FIGS. 9a, 9b, and 10, the step S110 in which the first mobile robot 100a specifies the wet contaminated region in the cleaning area B, the first mobile robot 100a may perform cleaning and specifying the wet contaminated region in the cleaning area B simultaneously. The controller 1800 of the first mobile robot 100a creates an obstacle map of the cleaning area and specifying a wet contaminated region based on a dust concentration and a floor image by controlling a driving unit and a cleaning unit.

In the step S110, specifically, if the first mobile robot 100a does not have a stored map as in an initial driving, the first mobile robot 100a may drives the cleaning area B and thus create a map through a wall following and/or sensing information by a sensing unit 130.

The first mobile robot 100a may classify the generated map into a plurality of regions R1, R2, R3, R4, and R5. The cleaning area B may be classified into a plurality of regions R1, R2, R3, R4, and R5 according to a predetermined algorithm.

For example, each time the mobile robot 100 travels a preset distance, a trajectory that the mobile robot 100 has passed may be grouped and classified into any one area.

As another example, the cleaning region B may be classified into a plurality of regions based on a partition shape. Specifically, the mobile robot 100 may recognize a wall, a door that can be opened, and the like of each room in the cleaning area B, and thus, classify a plurality of areas.

As yet another example, the cleaning region B may be classified into a plurality of regions based on areas of the plurality of regions. Specifically, the cleaning area B may be classified into a plurality of areas each having an area according to a predetermined criterion, and an area in which a wet contaminant A1 is present among the plurality of areas may be classified into a wet contaminated region.

As a method of specifying the wet contaminated region by the first mobile robot 100a, an image analysis method using a camera and a method using dust concentration may be used as described above.

In the step S113 of transmitting the cleaning command for the wet contaminated region, the first mobile robot 100a may collect location information of the wet contaminated region and transmit it to the second mobile robot 100b. The location information of the wet contaminated region may include coordinate value of the wet contaminated region on the obstacle map, an image of a periphery of the wet contaminated region, and a received signal strength (a received signal strength indication, RSSI) between at least one router T1 and T2 and the first mobile robot 100a in the wet contaminated region.

In this instance, the image of the periphery of the wet contaminated region is an image of a periphery (up, front, back, left, and right directions) of the first mobile robot 100a in the wet contaminated region.

Preferably, the location information of the wet contaminated region may be a combination of coordinate value of the wet contaminated region on the obstacle map with at least one of an image of the periphery of the wet contaminated region and a received signal strength between at least one router T1 and T2 and the first mobile robot 100a in the wet contaminated region. This is because it is difficult to accurately determine the location of the wet contaminated region using only the coordinate value of the wet contaminated region on the obstacle map.

In the steps S115 and S120 of moving to the wet contaminated region, the second mobile robot 100b receives the cleaning command for the wet contaminated region and the obstacle map from the first mobile robot 100a, and then, the second mobile robot 100b moves to the wet contaminated region.

Figure 9C:
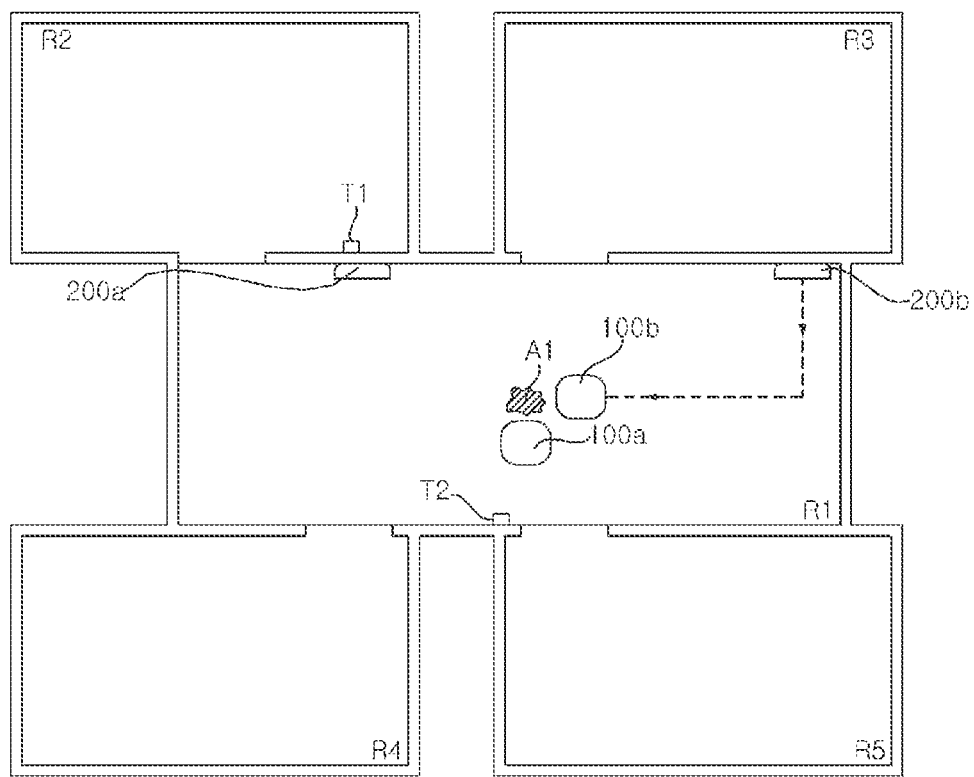
Figure 9D:
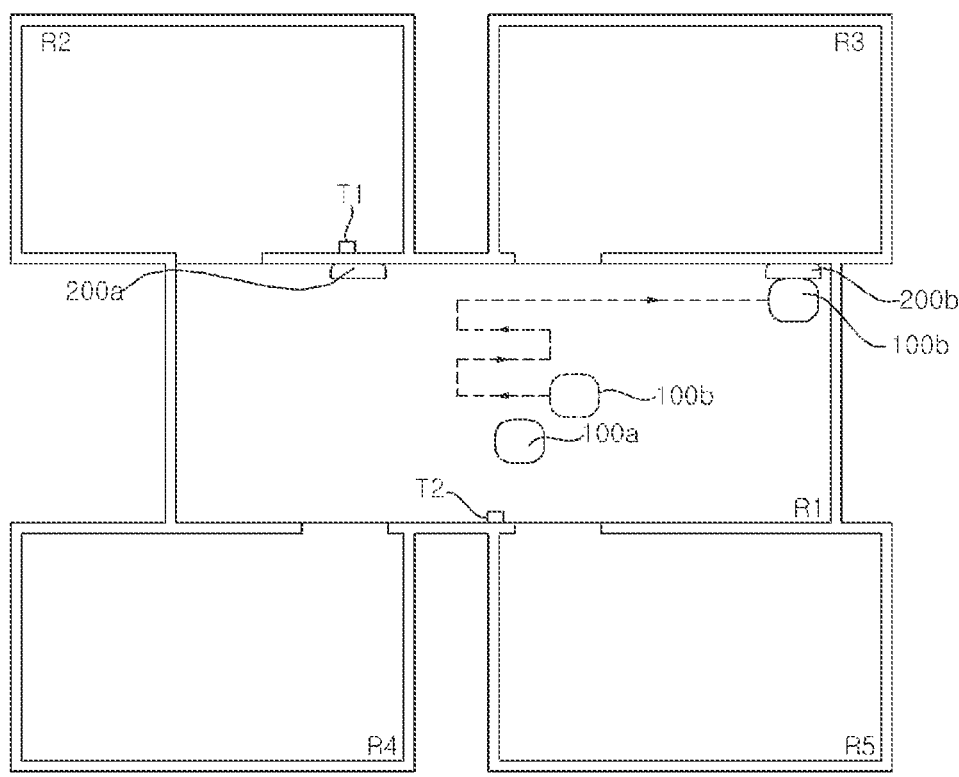

Referring to FIGS. 9c and 10, in order for the second mobile robot 100b to accurately move to the wet contaminated region, the second mobile robot 100b may specify the wet contaminated region based on at least one of coordinate value of the wet contaminated region on the obstacle map, an image of the periphery of the wet contaminated region, a received signal strength between the first mobile robot 100a and the second mobile robot 100b, and a received signal strength between at least one router T1 and T2 and the each mobile robot.

The controller 1800 may specify a wet contaminated region based on a coordinate value of the wet contaminated region on the obstacle map. The controller 1800 may specify a wet contaminated region based on an image of a periphery of a main body input by a sensing unit. The controller 1800 may specify a wet contaminated region on the obstacle map based on the coordinates of the wet contaminated region and the received signal strength between a communication unit and the first mobile robot 100a. The controller 1800 may specify a wet contaminated region based on coordinates of the wet contaminated region on the obstacle map and the received signal strength value between routers T1 and T2 and the second mobile robot 100b.

As an example of a method in which the second mobile robot 100b specifies the wet contaminated region, the second mobile robot 100b may specify the wet contaminated region based on the coordinate value of the wet contaminated region on the received obstacle map and the sensing value by the own sensing unit.

As another example of a method in which the second mobile robot 100b specifies the wet contaminated region, the second mobile robot 100b may specify the wet contaminated region based on the coordinate value of the wet contaminated region on the received obstacle map, an image of the periphery of the wet contaminated region, and a sensing value by the own sensing unit. Specifically, the second mobile robot 100b moves based on the coordinate value of the wet contaminated region, and then, detects a location that matches the image of the periphery of the wet contaminated region at a periphery of the wet contaminated region. That is, while the second mobile robot 100b collects images of its periphery including a ceiling using a sensor unit, the second mobile robot 100b may determine whether the received image of the periphery of the wet contaminated region and the images of its periphery match or not. If they match each other, the location may be specified as a wet contaminated region. In this instance, the image of the periphery of the wet contaminated region may include artificial markers.

As yet another example of a method in which the second mobile robot 100b specifies the wet contaminated region, the second mobile robot 100b may specify the wet contaminated region based on the coordinate value of the wet contaminated region on the received obstacle map, and a received signal strength value between at least one router T1 and T2 and each mobile robot, and a sensing value by the own sensing unit.

Specifically, while the second mobile robot 100b moves to the wet contaminated region based on coordinate value of the wet contaminated region and then moves at a periphery of the wet contaminated region, the second mobile robot 100b may measure a received signal strength value between the second mobile robot 100b and the routers T1 and T2. The second mobile robot 100b may compare the measured received signal strength value with the received signal strength value between the routers T1 and T2 and the first mobile robot 100a. When the measured received signal strength value is the same as or similar to the received signal strength value between the routers T1 and T2 and the first mobile robot 100a, the location may be specified as a wet contaminated region.

A plurality of mobile robots may be connected to the routers T1 and T2 by short-range or medium-range wireless communication. Since there is a difference in the received signal strength value depending on a distance between each of the routers T1 and T2 and each mobile robot, an accurate location can be specified based on the received signal strength value.

As still another example of a method in which the second mobile robot 100b specifies the wet contaminated region, the first mobile robot 100a may wait at the periphery of the wet contaminated region or around the wet contaminated region until the second mobile robot 100b completes a movement to the wet contaminated region (S117). Specifically, the first mobile robot 100a may detect a proximity of the second mobile robot 100b based on a collected image or a received signal sensitivity value between the first mobile robot 100a and the second mobile robot 100b. The second mobile robot 100b may specify the wet contaminated region based on coordinate value of the wet contaminated region on the obstacle map and the received signal strength value between the first mobile robot 100a and the second mobile robot 100b.

Specifically, while the second mobile robot 100b moves to the wet contaminated region with reference to coordinate value of the wet contaminated region and then moves at a periphery of the wet contaminated region, the second mobile robot 100b may measure a received signal strength value between the second mobile robot 100b and the first mobile robot 100a. The second mobile robot 100b may compare the measured received signal strength value with a preset received signal strength value. When the measured received signal strength value exceeds the preset received signal strength value, the location may be specified as a wet contaminated region.

As another example, a liquid detection sensor 1411 may be installed at a lower portion of a front side of a main body of the second mobile robot 100b, and the second mobile robot 100b may specify the wet contaminated region based on a coordinate value of the wet contaminated region on the received obstacle map and a sensing value of the liquid detection sensor 1411. Specifically, the second mobile robot 100b may move to the wet contaminated region based on the coordinate value, and, when the liquid is detected during the second mobile robot 100b driving the wet contaminated region, the location may be specified as the wet contaminated region.

The second mobile robot 100b includes a step S130 of cleaning the wet contaminated region.

The fact that the second mobile robot 100b cleans the wet contaminated region may mean that the controller 1800 of the second mobile robot 100b controls a driving unit of the second mobile robot 100b so that a main body of the second mobile robot 100b travels at least once, preferably two or more times, the wet contaminated region or travels the wet contaminated region. When the second mobile robot 100b travels the wet contaminated region, a wet contaminant A1 may be removed by a mop portion installed on a lower surface of the second mobile robot 100b.

As another example, the fact that the second mobile robot 100b cleans the wet contaminated region may mean that, while the controller 1800 of the second mobile robot 100b may control a driving unit of the second mobile robot 100b so that a main body of the second mobile robot 100b travels at least once, preferably two or more times, or travels the wet contaminated region, the controller 1800 may drive a clean unit to rotate a mop, such as a spin-mop.

The second mobile robot 100b may notify the first mobile robot 100a of a cleaning completion after the cleaning of the wet contaminated region is completed (S135). The controller 1800 of the second mobile robot 100b may control the communication unit to transmit a signal of a cleaning completion of the wet contaminated region to the first mobile robot 100a.

The first mobile robot 100a may determine whether a wet contaminant A1 exists in the wet contaminated region after the second mobile robot 100b completes cleaning of the wet polluted region (S140). Specifically, when the first mobile robot 100a receives a signal of the cleaning completion of the wet contaminated region from the second mobile robot 100b, the first mobile robot 100a may control the liquid detection sensor 1411 or the floor image sensor 1430, thereby determining whether or not a wet contaminant A1 exists in the wet contaminated region.

Therefore, since only the first mobile robot 100a specifies the wet contaminated region, a sensor for determining the wet contaminant A1 may installed only on the first mobile robot 100a and may be not installed on the second mobile robot 100b, thereby reducing a manufacturing cost.

When the first mobile robot 100a determines that the wet contaminant A1 is still exists in the wet contaminated area after the second mobile robot 100b completes the cleaning of the wet contaminated region, the second mobile robot 100a may transmit a signal of a re-cleaning command for the wet contaminated region (S145).

When the second mobile robot 100b receives the re-cleaning command for the wet contaminated region from the first mobile robot 100a, the second mobile robot 100b may re-clean the wet contaminated region (S160).

When the first mobile robot 100a determines that the wet contaminant A1 does not exist in the wet contaminated region after the second mobile robot 100b completes the cleaning of the wet contaminated region, the first mobile robot 100a may perform cleaning of the cleaning region B again (S163). Specifically, when the first mobile robot 100a determines that the wet contaminant A1 does not exist in the wet contaminated region, the first mobile robot 100a may perform cleaning of an area excluding the wet contaminated region or cleaning of the cleaning area B including the wet contaminated region. In this instance, the first mobile robot 100a may travel again along a driving path before discovering the wet contaminated region. The phrase of "the first mobile robot 100a performs cleaning" may mean that the first mobile robot 100a controls the cleaning unit while driving, and thus, inhales foreign materials by pressure or sweeps and inhales the foreign materials.

After the cleaning completion of the wet contaminated region, the second mobile robot 100b may perform cleaning while following the first mobile robot 100a (S165). Specifically, when the second mobile robot 100b continuously receives a cleaning signal of the cleaning area B from the first mobile robot 100a, or the second mobile robot 100b perform collaborative cleaning while following the first mobile robot 100a when the first mobile robot 100a leaves the periphery of the wet contaminated region.

For the following/collaboration, for example, a collaborative scenario may be generated such that a sum of a travel path or a travel time of the first mobile robot 100a and the second mobile robot 100b is the shortest, by applying a shortest path algorithm such as a Dijkstra algorithm, an A* (A-star) algorithm, or so on, based on the recognized relative locations. Alternatively, a collaborative scenario may be generated in which a cleaning area is divided and allocated based on a cleaning priority for a plurality of divided areas and the remaining battery amount of the first mobile robot 100a and the second mobile robot 100b.

On the other hand, the above has been described as an example of collaborative cleaning using two cleaners. The present disclosure is not limited thereto. Accordingly, embodiments of the present disclosure may be applied when three or more cleaners perform collaborative cleaning while recognizing locations of other cleaners.

As described above, according to a plurality of autonomous driving cleaners according to an embodiment of the present disclosure, a plurality of mobile robots can efficiently perform collaborative cleaning by recognizing locations of other cleaners in a designated space without mounting a position sensor.

In addition, even when different cleaning maps are used for the same space because types of mobile robots are different from each other, relative locations of each other can be easily grasped without additionally sharing a simultaneous localization and mapping (SLAM). Accordingly, a collaborative scenario can be efficiently modified or updated according to the relative locations of the plurality of mobile robots while performing the collaborative cleaning.

Figure 11:
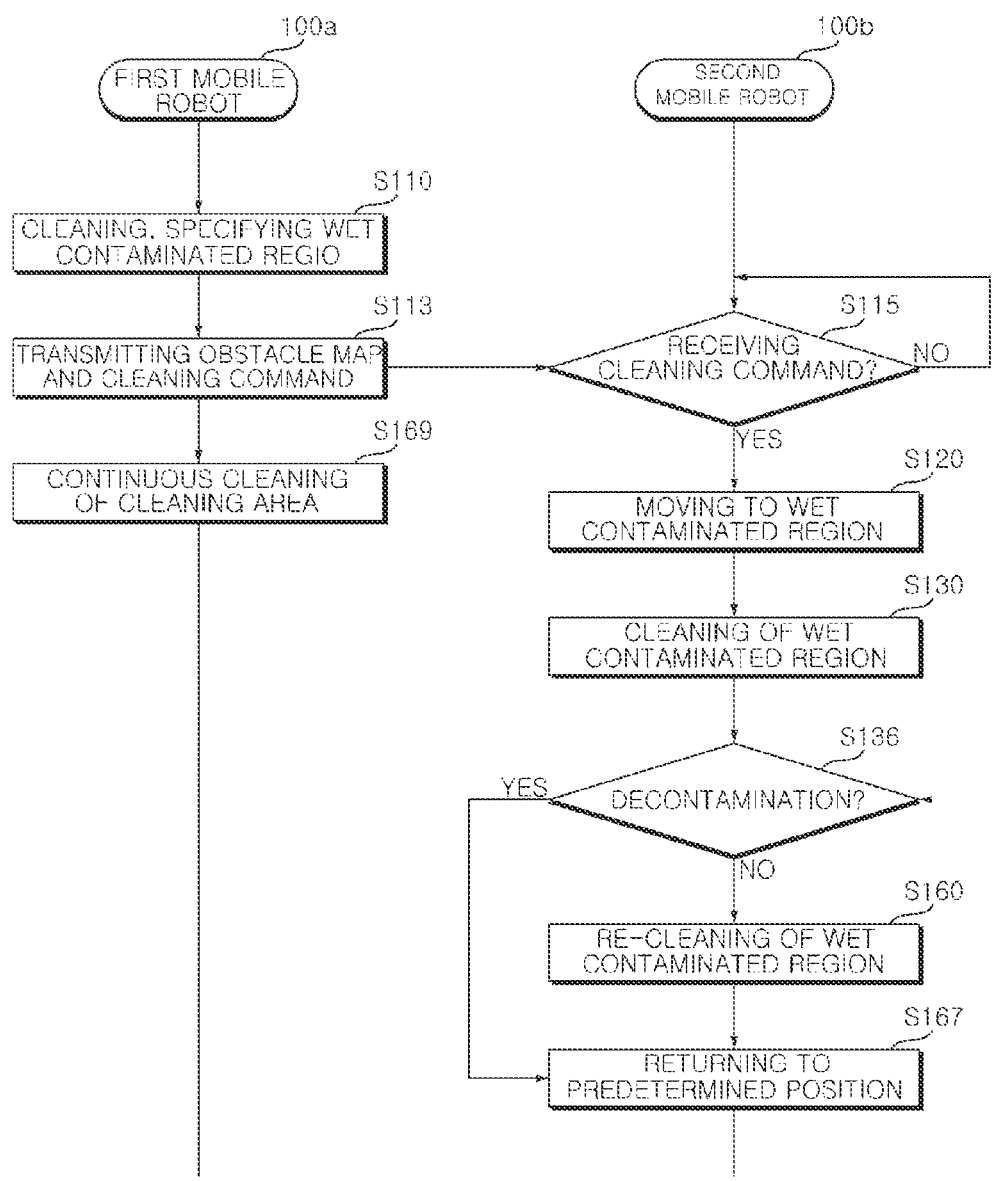
FIG. 11 is a flowchart of a control method of a plurality of robot cleaners according to a second embodiment of the present disclosure.

FIG. 11 is a flowchart of a control method of a plurality of robot cleaners according to a second embodiment of the present disclosure.

In a control method of a robot cleaner according to a second embodiment, as compared with the first embodiment, there are differences as follows. That is, a first mobile robot 100a transmits a cleaning command of a wet contaminated region to a second mobile robot 100b and immediately cleans a cleaning area (B) excluding the wet contaminated region. The second mobile robot 100b cleans the wet contaminated region, determines whether the wet contaminant A1 remains or not, and returns to a predetermined position (for example, an original position).

Hereinafter, the same steps as in the first embodiment will be omitted, and differences will be mainly described. The same reference numerals are used for the same steps as in the first embodiment.

After the first mobile robot 100a transmits a cleaning command for a wet contaminated region to the second mobile robot 100b, the first mobile robot 100a may perform cleaning on the cleaning area B excluding the wet contaminated region (S169). The first mobile robot 100a may return to a predetermined position after completing the cleaning of the cleaning area B.

After a cleaning completion of the wet contaminated region, the second mobile robot 100b may determine whether a wet contaminant A1 remains in the wet contaminated region (S136). When the wet contaminant A1 remains in the wet contaminated region, the second mobile robot 100b may perform re-cleaning for the wet contaminated region (S160).

After the second mobile robot 100b completes cleaning of the wet contaminated region, the second mobile robot 100b may return to a predetermined position (S167). Specifically, when the controller 1800 of the second mobile robot 100b may determine that no liquid remains in the wet contaminated region or completes re-cleaning of the wet contaminated region, the controller 1800 of the second mobile robot 100b may control a driving unit so that the second mobile robot 100b may be returned to a predetermined position.

A dust sensor 1420 and a floor image sensor 1430 may be installed on the second mobile robot 100b so that the first mobile robot 100a can complete cleaning without waiting for the second mobile robot 100b.

Figure 12:
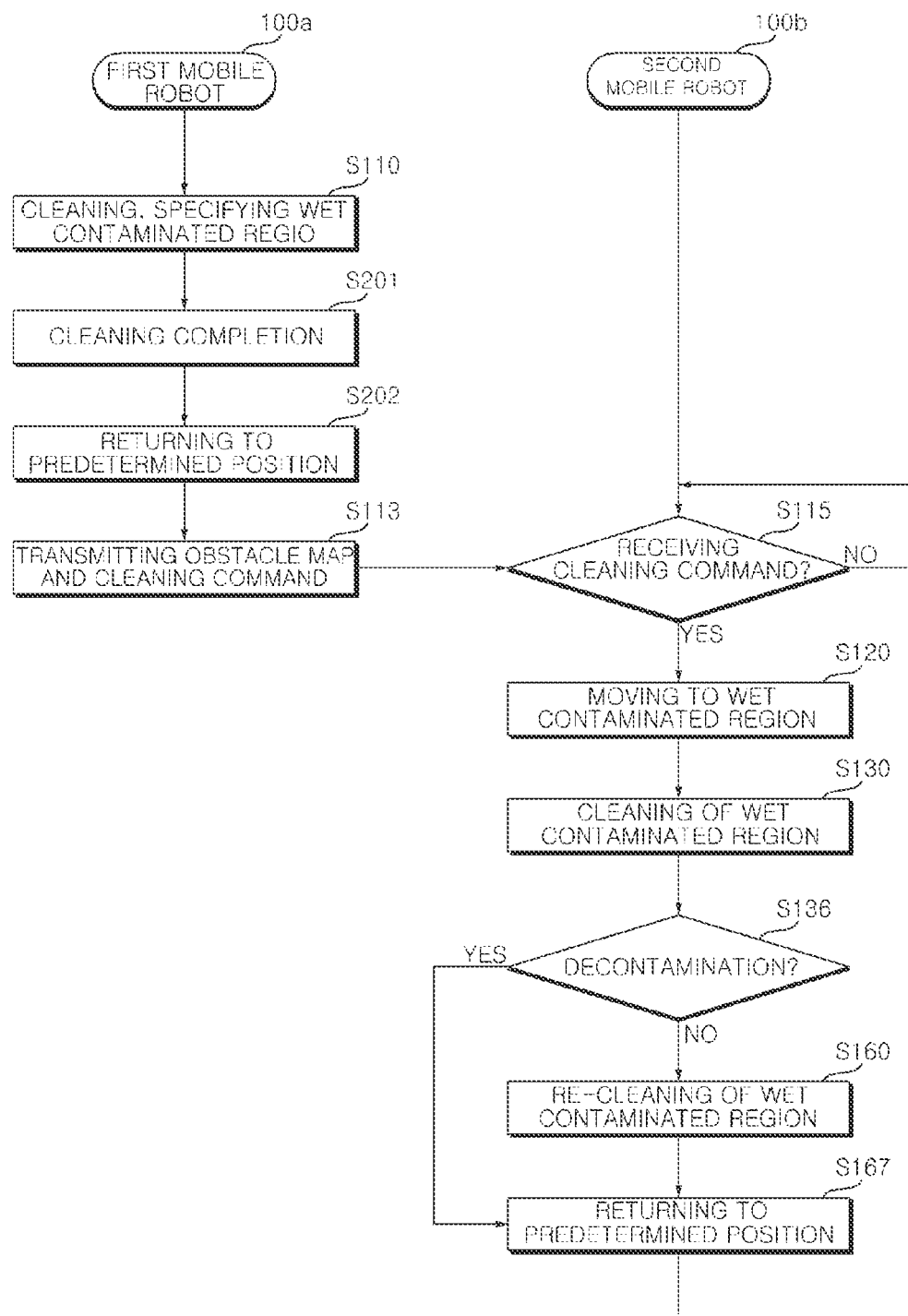
FIG. 12 is a flowchart of a control method of a plurality of robot cleaners according to a third embodiment of the present disclosure.

FIG. 12 is a flowchart of a control method of a plurality of robot cleaners according to a third embodiment of the present disclosure.

Referring to FIG. 12, in a control method of a robot cleaner according to a third embodiment, as compared with the second embodiment, there is a difference in that, even if a first mobile robot 100a finds a wet contaminated region, the first mobile robot 100a transmits a cleaning command for a wet contaminated region to a second mobile robot 100b after a cleaning completion of the cleaning area B.

The first mobile robot 100a may specify the wet contaminated region and complete cleaning of the cleaning area B (S201). After the first mobile robot 100a completes the cleaning, the first mobile robot 100a may return to a predetermined position (S202) and transmit an obstacle map and a cleaning command for the wet contaminated region to the second mobile robot 100b (S203).

Figure 13:
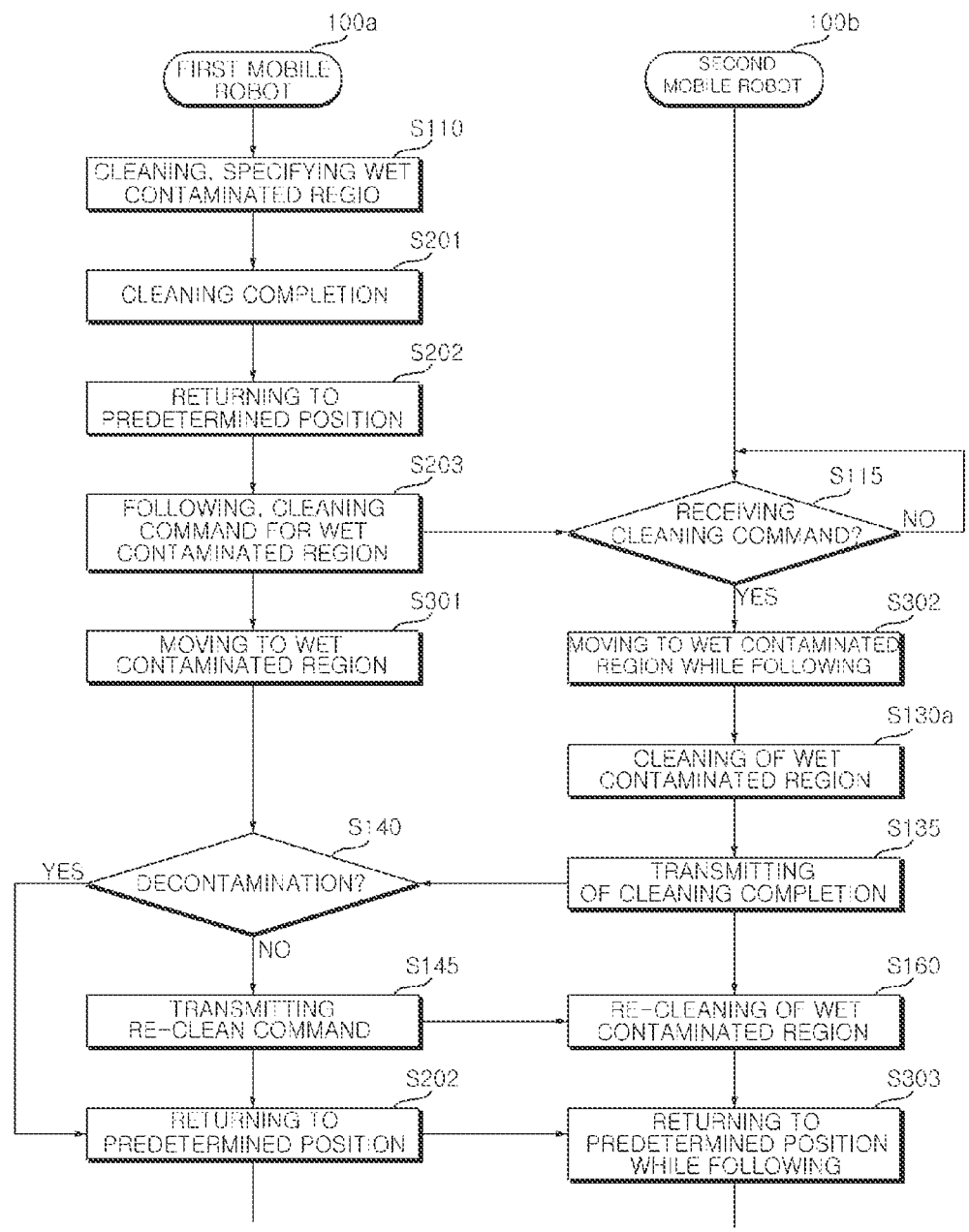
FIG. 13 is a flowchart of a control method of a plurality of robot cleaners according to a fourth embodiment of the present disclosure.

FIG. 13 is a flowchart of a control method of a plurality of robot cleaners according to a fourth embodiment of the present disclosure.

Referring to FIG. 13, in a control method of a robot cleaner according to a fourth embodiment, as compared with the third embodiment, there is a difference in that, if a first mobile robot 100a finds a wet contaminated region, the first mobile robot 100a may move to a location of the second mobile robot 100b and then move to the wet contaminated area with the second mobile robot 100b so that the second mobile robot 100b moves to the wet contaminated region while following the first mobile robot 100a and then clean the wet contaminated region.

Therefore, this cleaning method does not need to share an obstacle map between the first mobile robot 100a and the second mobile robot 100b, and the second mobile robot 100b may be not provided with a sensor that specifies a wet contaminated region.

In the control method according to the embodiment, a step S110 in which the first mobile robot 100a specifies the wet contaminated region in the cleaning area B, steps S201 an S202 in which the first mobile robot 100a completes cleaning of the cleaning area B excluding the wet contaminated region and moves to a periphery of the second mobile robot 100b, a step (S299) in which the first mobile robot 100a transmits a following command to the second mobile robot 100b and moves to the wet-contaminated region in a case that the wet contaminated region is specified, a step (S302) in which the second mobile robot 100b moves to the wet contaminated region while following the first mobile robot 100a when the second mobile robot 100b receives the follow command, and a step (S130a) in which the second mobile root 100b cleans a predetermined area at a periphery of the first mobile robot 100a after the first mobile robot 100a arrives at the wet contaminated region.

The first mobile robot 100a may specify the wet contaminated region while cleaning the cleaning area B (S110) and may complete cleaning of the cleaning area B (S201). After the first mobile robot 100a completes cleaning, the first mobile robot 100a may return to a predetermined position (at a periphery of the second mobile robot 100b) (S202). Thereafter, when the first mobile robot 100a specifies the wet contaminated region, the first mobile robot 100a may transmit a following command and a cleaning command for the wet contaminated region to the second mobile robot 100b, and the first mobile robot 100a moves to the wet contaminated region (S299).

When the second mobile robot 100b receives the following command, the second mobile robot 100b may move to the wet contaminated region while following the first mobile robot 100a (S302). After the second mobile robot 100b arrives at the wet contaminated region, the second mobile robot 100a may clean a preset area which is a periphery of the first mobile robot 100a as the wet contaminated region (S130a).

Thereafter, the first mobile robot 100a may determine whether the cleaning has been performed completely for the wet contaminated region (S140). When the wet contaminant A1 exist in the wet contaminated region, the first mobile robot 100a may transmit a re-cleaning command to the second mobile robot 100b (S145). When the wet contaminant A1 does not exist in the wet contaminated region, the first mobile robot 100a may return to a predetermined position (S202).

When the second mobile robot 100b receives the re-cleaning command from the first mobile robot 100a, the second mobile robot 100b may perform re-cleaning for the wet contaminated region (S160). When the re-cleaning is completed or the cleaning of the wet contaminated region is completed, the second mobile robot 100b may return a predetermined position while following the first mobile robot 100a (S303).

Although the preferred embodiments of the present disclosure have been illustrated and described above, the present disclosure is not limited to the specific embodiments described above, and the present disclosure belongs without departing from technical features of the present disclosure claimed in the claims. Also, various modifications can be made by those skilled in the art, and these modifications should not be individually understood from the technical spirit or prospect of the present disclosure.

What is claimed is:

1. A mobile robot, comprising:
   a driving unit of moving a main body;
   a cleaning unit of sucking a dust;
   a dust sensor of measuring a dust concentration in air sucked by the cleaning unit;
   a floor image sensor of obtaining a floor image of a periphery of the main body; and
   a controller of determining a wet contaminated region based on information input from the dust sensor and the floor image sensor,
   wherein the controller specifies at least one suspected wet contaminated region where the dust concentration is relatively low in a cleaning area, and specifies the suspected wet contaminated region as the wet contaminated region based on a floor image of the suspected wet contaminated region.

2. The mobile robot of claim 1, wherein the controller compares the floor image of the suspected wet contaminated region with a floor image of a periphery of the suspected wet contaminated region to specify the wet contaminated region.

3. The mobile robot of claim 1, wherein the controller compares a color of the floor image of the suspected wet contaminated region with a color of a floor image of a periphery of the suspected wet contaminated region to specify the wet contaminated region.

4. The mobile robot of claim 1, wherein the controller divides the floor image of the suspected wet contaminated region into a plurality of lower suspect regions and compares colors of floor images of the plurality of lower suspect regions to specify at least one of the plurality of lower suspect regions as the wet contaminated region.

5. The mobile robot of claim 1, wherein the controller divides the floor image of the suspected wet contaminated region into a plurality of lower suspect regions and compares floor heights of floor images of the plurality of lower suspect regions to specify at least one of the plurality of lower suspect regions as the wet contaminated region.

6. The mobile robot of claim 1, wherein the controller transmits location information of the wet contaminated region to a second mobile robot that cleans in a different manner from the mobile robot.

7. The mobile robot of claim 1, wherein the controller transmits a floor image of the wet contaminated region to a terminal connected by wireless communication with the mobile robot.

8. The mobile robot of claim 1, further comprising:
   a sweeping portion of rotating around a rotation axis to sweep a floor, and
   a sweeping load sensor of measuring a load of the sweeping portion.

9. The mobile robot of claim 8, wherein the controller specifies the suspected wet contaminated region as the wet contaminated region based on the floor image of the suspected wet contaminated region and the load of the sweeping portion of the suspected wet contaminated region.

10. The mobile robot of claim 6, wherein the location information of the wet contaminated region includes an image of a periphery of the wet contaminated region.

11. The mobile robot of claim 6, wherein the location information of the wet contaminated region includes a coordinate of the wet contaminated region on an obstacle map and a received signal strength indication (RSSI) value between the second mobile robot and the mobile robot.

12. The mobile robot of claim 6, wherein the controller transmits a control command to the second mobile robot so that the second mobile robot cleans the wet contaminated region.

13. The mobile robot of claim 12, wherein the controller controls the mobile robot to wait at a periphery of the wet contaminated region when the second mobile robot cleans the wet contaminated region.

* * * * *